(12) United States Patent
Singh et al.

(10) Patent No.: US 12,181,350 B2
(45) Date of Patent: Dec. 31, 2024

(54) TEMPERATURE SENSOR WITH DELTA BASE-EMITTER VOLTAGE AMPLIFICATION AND DIGITAL CURVATURE CORRECTION

(71) Applicant: Analog Devices International Unlimited Company, Limerick (IE)

(72) Inventors: Gaurav Singh, Lucknow (IN); Wreeju Bhaumik, Bangalore (IN)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 148 days.

(21) Appl. No.: 17/524,988

(22) Filed: Nov. 12, 2021

(65) Prior Publication Data
US 2023/0152165 A1    May 18, 2023

(51) Int. Cl.
*G01K 15/00*    (2006.01)
*G01K 7/01*    (2006.01)

(52) U.S. Cl.
CPC ............. *G01K 15/005* (2013.01); *G01K 7/01* (2013.01); *G01K 2219/00* (2013.01)

(58) Field of Classification Search
CPC .............................. G01K 7/01; G01K 2219/00
See application file for complete search history.

(56) References Cited

U.S. PATENT DOCUMENTS

| | | | |
|---|---|---|---|
| 5,982,221 A * | 11/1999 | Tuthill | H01L 23/34 327/512 |
| 6,060,874 A | 5/2000 | Doorenbos | |
| 9,389,126 B2 | 7/2016 | Kim et al. | |
| 9,753,138 B1 * | 9/2017 | Snow | G01J 3/46 |
| 2006/0039445 A1 * | 2/2006 | McLeod | G01K 7/00 374/178 |

(Continued)

FOREIGN PATENT DOCUMENTS

CN    111351589 A    6/2020

OTHER PUBLICATIONS

Tuthill, *A Swtiched-Current, Switched-Capacitor Temperature Sensor in 0.6-μm CMOS*, IEEE Journal of Solid-State Circuits, vol. 33, No. 7, Jul. 1998, 6 pages.

(Continued)

*Primary Examiner* — Mirellys Jagan
(74) *Attorney, Agent, or Firm* — ARENTFOX SCHIFF LLP

(57) ABSTRACT

Systems, devices, and methods related to temperature sensors for electronic devices are provided. An example temperature sensor device includes analog temperature sensor circuitry to generate a plurality of voltages indicative of a temperature; an analog-to-digital converter (ADC) disposed downstream of the analog temperature sensing circuitry; switched-capacitor amplifier circuitry disposed before the ADC, the switched-capacitor amplifier circuitry comprising a single-ended amplifier to amplify the plurality of voltages with respect to a common voltage; a first switch coupled between the analog temperature sensor circuitry and the switched-capacitor amplifier circuitry to provide a sampling phase and an integration phase; and digital calculation circuitry to calculate a temperature value based on the plurality of amplified voltages.

9 Claims, 11 Drawing Sheets

(56) References Cited

U.S. PATENT DOCUMENTS

| | | | |
|---|---|---|---|
| 2006/0193370 A1* | 8/2006 | St. Pierre | G01K 7/01 |
| | | | 374/178 |
| 2008/0095213 A1 | 4/2008 | Lin et al. | |
| 2010/0161261 A1* | 6/2010 | Drapkin | G01K 7/01 |
| | | | 702/65 |
| 2018/0226929 A1* | 8/2018 | Kamath | H03M 1/00 |
| 2020/0129770 A1 | 4/2020 | Opris et al. | |
| 2020/0333196 A1* | 10/2020 | Zanbaghi | G01K 7/01 |

OTHER PUBLICATIONS

Du et al., *A Curature-Compensated Bandgap Reference with Improved PSRR*, © 2005 IEEE, 0-7803-9210-8/05, 4 pages.
Partial European Seach Report issued in corresponding European Application No. 22205935.4-1001 dated Apr. 12, 1 2023.
Extended European Search Report in EP22205935.4, mailed Aug. 25, 2023, 14 pages.

\* cited by examiner

TEMPERATURE SENSOR WITH DELTA BASE-EMITTER VOLTAGE AMPLIFICATION AND DIGITAL CURVATURE CORRECTION

TECHNICAL FIELD OF THE DISCLOSURE

The present disclosure generally relates to electronic devices, and, more specifically, to temperature sensors for electronic devices.

BACKGROUND

Temperature has a significant effect on electronic devices. For instance, temperature can impact both the system performance and/or the expected life of components. Measuring and monitoring temperature accurately can allow an electronic system to compensate for its effects and prevent overheating problems.

Temperature sensors can be built from semiconductor devices, such as a bipolar junction transistor (BJT). A BJT device may include an emitter region, a base region, and a collector region. Because of the known temperature and current dependence of the forward-biased base-emitter junction voltage (VBE) at the BJT device, the BJT device may be suitable for temperature measurement. For example, a temperature measurement may be obtained from the BJT device by subtracting two VBE voltages at two different bias currents having a known ratio. The difference between the two VBEs is proportional to absolute temperature (PTAT) of the BJT device. The base-emitter voltage difference may also be referred to as a delta VBE.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
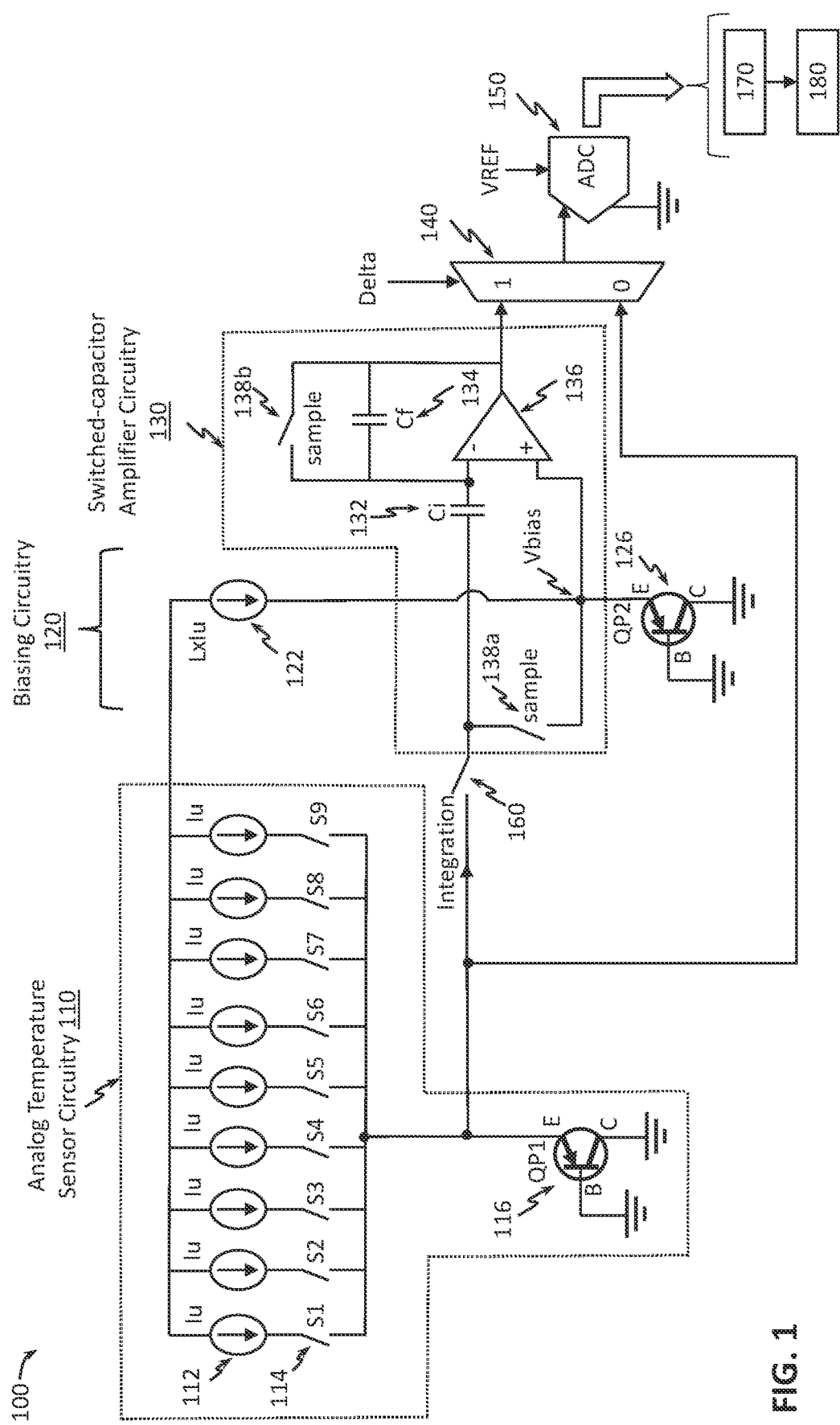
FIG. 1 is a schematic block diagram illustrating exemplary temperature sensor circuitry, according to some embodiments of the present disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

For purposes of illustrating temperature sensors with delta base-emitter voltage amplification and digital curvature correction, proposed herein, it may be useful to understand how a device may utilize a transistor (e.g., a bipolar junction transistor (BJT)) to provide a temperature reading. The following foundational information may be viewed as a basis from which the present disclosure may be properly explained. Such information is offered for purposes of explanation only and, accordingly, should not be construed in any way to limit the broad scope of the present disclosure and its potential applications.

As described above, a BJT device can be used to measure temperature by subtracting two forward-based base-emitter junction (VBE) voltages at two different bias currents having a known ratio. To that end, a temperature sensor utilizing a BJT for temperature sensing may inject two current with a known ratio (e.g., a first current having a unit current represented by 1u and a second current having N units of current represented by N×1u into the BJT). A temperature may be estimated from the voltage difference (ΔVBE) between a first VBE at the BJT in response to the first injected current and a second VBE at the BJT in response to the second injected current according to the following relationship:

$$\Delta VBE = \frac{kB \times T}{q} \times \ln(N), \quad (1)$$

where kB represents the Boltzmann's constant, T represents the temperature in Kelvin, q represents the charge of an electron, and N represents the known current ratio.

To obtain a digital reading of the temperature, the temperature sensor device may include an analog-to-digital converter (ADC) to convert the first VBE (an analog voltage) to a first digital value and the second VBE (an analog voltage) to a second digital value. Subsequently, the first digital value can be subtracted from the second digital value to obtain a digital representation of ΔVBE and the temperature can be estimated according to equation (1). Temperature obtained from ΔVBE using equation (1) is proportional to absolute temperature (PTAT) and can provide an accurate measure of the temperature (e.g., a current operating temperature) of the device. However, its PTAT coefficient is small (e.g., about 200 microvolt per degree Celsius (μV/deg C.) for N=9 where the PTAT coefficient may be dependent on log(N)). Utilizing a commonly available 12-bit ADC operating with a 2.5 V reference voltage, the least significant bit (LSB) resolution can create up to about 5 degrees of error in temperature. That is, the 12-bit ADC operating at the 2.5 V voltage may output the same digital code for two ΔVBEs corresponding to two difference temperatures with less than about 5 degrees of difference. In order to achieve 1 deg C. precision, a very precise or high-resolution ADC, such as a 16-bit ADC or sigma-delta ADC, may be used, but such an ADC can be expensive or slow and may not be an acceptable solution.

One way of negating the resolution limitation of the ADC is to pre-amplify the signal of interest (the VBE signal). While amplifying the VBEs (e.g., the first VBE and the second VBE) prior to analog-to-digital conversion can improve the accuracy of a digital representation of $\Delta$VBE, the ADC may not have a sufficient headroom to accommodate a high enough analog amplification (e.g., 10 times) of the VBEs. For example, VBE may typically be in a range between about 0.5 V to about 0.7 V, and thus 10 times analog amplification of a VBE would exceed a supply voltage rail of typically about 1 V to about 3V.

Further, analog-to-digital conversion errors can add additional inaccuracies to the temperature measurement. For example, unstable or time varying reference voltages (such as in the case when IC supply voltage source doubles up as an ADC reference) for an ADC can cause variances such as large gain errors in the temperature sensor results. While post-production trimming can mitigate some but not all of these inaccuracies, post-production trimming can be time consuming and costly and susceptible to aging. Accordingly, in some approaches, a digital reference method may be used to cancel the effect of varying or unknown analog reference voltage for providing digital representations of VBEs, for example, as described in U.S. Pat. No. 9,389,126, titled "Method and apparatus for low cost, high accuracy temperature sensor." At a high level, the digital reference method is a technique to make the temperature readout of the ADC independent of the ADC reference voltage by digitally creating a bandgap reference $\Delta$VBE+K×VBE, where K is a programmed number. That is, while the analog reference voltage can vary with time or may be unknown (e.g., between about 1.5 V to about 2.1 V), the digital reference technique may not be impacted by errors in the unknown reference voltage supply, and thus the supply voltage error may not become a temperature error in the temperature calculation.

Further still, while $\Delta$VBE is PTAT and VBE is complimentary to absolute temperature (CTAT), the band gap voltage $\Delta$VBE+K×VBE can be made constant at certain chosen temperatures by programming a particular K value, the bandgap voltage can still vary across a range of temperatures (e.g., between about −40 deg C. to about 125 deg C.) due to nonlinearity of the VBE. The error or deviation of the bandgap voltage may be in the form of curve when plotted against temperatures T. Thus, the bandgap voltage error or deviation may be referred to as a VBE(T) curvature. In digital reference-based temperature sensing, the error from VBE(T) curvature may be a next significant error contributor after errors from ADC precision limitation.

The present disclosure describes mechanisms for providing high-accuracy temperature sensors with delta base-emitter voltage (e.g., $\Delta$VBE) amplification and digital curvature correction. In an embodiment, a temperature sensor device may include analog temperature sensor circuitry to generate a plurality of voltages (e.g., VBEs) indicative of a temperature. The analog temperature sensor circuitry may include a transistor (e.g., a single BJT) and one or more current sources. The one or more current sources may generate a first amount of current (e.g., a unit current I) and a second amount of current (e.g., N units of current, N×I). The transistor may generate a first base-emitter voltage responsive to the first amount of current and a second base-emitter voltage responsive to the second amount of current. The temperature of the device may be estimated based on a voltage change (e.g., a voltage increase) between the first and second base-emitter voltages. This transistor, as used herein, may be referred to as a temperature sensing transistor. The temperature sensor device may further include an ADC disposed downstream of the analog temperature sensor circuitry to provide digital readouts of base-emitter voltages.

According to some embodiments of the present disclosure, to provide amplification of VBEs prior to analog-to-digital conversion, the temperature sensor device may further include switched-capacitor amplifier circuitry disposed before (e.g., upstream of) the ADC. For instance, the switched-capacitor amplifier circuitry may include a single-ended amplifier, a first capacitor, and a second capacitor. The first capacitor may be coupled to a first input (e.g., inverting input) of the single-ended amplifier. The first input may receive the first and second base-emitter voltages (according to a defined sequence) from the analog temperature sensor circuitry. For instance, the first input may receive the first base-emitter voltages followed by the second base-emitter voltage, or vice versa. The second capacitor may be coupled between the first input and an output of the single-ended amplifier. The first capacitor may have a greater capacitance than the second capacitor to provide amplification to an input signal (e.g., the first and second base-emitter voltages). To avoid amplifying VBEs directly due to the limited ADC or supply headroom, the VBE amplification may be made with respect to a common sensor reference voltage (Vbias) or simply referred to as a common voltage, for example, by providing the common sensor reference voltage at a second input (e.g., non-inverting input) of the single-ended amplifier and setting the common sensor reference voltage according to a desirable or suitable headroom for the ADC. This allows the amplifier to operate in a sweet spot, providing a sufficient amplification for $\Delta$VBE without exceeding the ADC headroom. In an embodiment, the switched-capacitor amplifier circuitry may be configured to provide an amplification gain equal to the number of current sources in the analog temperature sensor circuitry to avoid a division operation in temperature calculation during runtime as will be discussed more fully below. In an embodiment, to provide the common sensor reference voltage for the amplifier, the temperature sensor device may further include biasing circuitry including another transistor (e.g., a second BJT) and a further current source to provide a third amount of current (e.g., L units of current, where L may be greater than N) to the other transistor. The other transistor may generate a third base-emitter voltage, which may be used as the common sensor reference voltage for the single-ended amplifier. This other transistor, as used herein, may be referred to as a common sensor reference transistor.

According to embodiments of the present disclosure, to provide a good output headroom for the amplifier to operate on, the temperature sensor device may start with a sampling phase to sample the common sensor reference voltage, followed by an integration phase during which temperature sensing may be performed. To provide the sampling phase and the integration phase, the temperature sensor device may further include a first switch (e.g., an integration switch) coupled between the analog temperature sensor circuitry and the switched-capacitor amplifier circuitry. In some instances, the first switch may be coupled between an emitter of the temperature sensing transistor in the analog temperature sensor circuitry and the first input (e.g., the inverting input) of the single-ended amplifier. The switched-capacitor amplifier circuitry may further include two in-phase sampling switches, for example, a second switch coupled between the first input and the output of the single-ended amplifier and a third switch coupled between the first switch and the second input (e.g., the non-inverting input where the common sensor reference voltage is received) of the single-ended amplifier.

As explained above, a digital bandgap reference may be used to decouple the ADC reference voltage dependence from the digital readouts (e.g., the first digital values and the second digital value). To utilize the digital bandgap reference, a division by the digital bandgap reference may be applied to the digital readouts. Division in digital circuitry can be costly. According to embodiments of the present disclosure, the digital bandgap reference can be determined and calibrated during post-production calibration and a scaling factor associated with the inverse of the digital bandgap reference can be stored in memory of the device so that a multiplication can be performed instead of a division during runtime. Further, other factors for converting $\Delta VBE$ to temperature as shown in equation (1) above can be combined with the inverse of the digital bandgap reference to provide a single value for multiplication. This avoids any additional overhead in incorporating the digital reference method. Accordingly, the runtime temperature computation complexity can be reduced, and thus may reduce area (e.g., die area) and power consumption. Further, as explained above, there is a VBE(T) curvature error associated with the digital bandgap reference due to VBE voltage nonlinearity. The VBE(T) curvature error can be first converted into an equivalent temperature error as plotted in FIG. 5. To overcome this error, temperature-dependent correction values may be determined by simulation and programmed or hard coded in the device for temperature conversion compensation at runtime.

The systems, schemes, and mechanisms described herein can advantageously provide amplification of $\Delta VBE$ (e.g., with a gain of about 9 or above) without amplifying VBEs directly to overcome the ADC headroom limitation. This may allow a temperature sensor device to utilize a low-resolution (e.g., 10 bits or less), low performance, and/or low-power ADC and still achieve a high accuracy (e.g., with an accuracy of about 1 degree) for digital temperature readouts. Additionally, utilizing a transistor (e.g., similar to the temperature sensing transistor) to generate a common sensor reference voltage for the switched-capacitor amplifier circuitry can advantageously track changes in the temperature sensing transistor as temperature varies and allow consistent headroom for $\Delta VBE$ amplification. Further, determining a digital bandgap reference and storing an inverse of the digital bandgap reference during post-production can eliminate a division operation in runtime, saving power and area. Further still, storing or hardcoding digital temperature-dependent correction values (e.g., for curvature correction in a digital domain) can allow for more accurate temperature measurements without additional analog circuitry, again saving power and area. The present disclosure is suitable for use in any devices, systems, and/or applications, such as portable devices, wireless radio transceivers and system, battery management systems, automotive, industrial automation, instrumentation and measurements, energy applications, for temperature monitoring.

Example Temperature Sensor with $\Delta VBE$ Amplification

FIG. 1 is a schematic block diagram illustrating exemplary temperature sensor circuitry 100, according to some embodiments of the present disclosure. In some embodiments, the temperature sensor circuitry 100 may be within a standalone temperature sensor. In other embodiments, the temperature sensor circuitry 100 may be part of an integrated circuit device or a system-on-chip (SoC) device. For instance, the temperature sensor circuitry 100 may be an on-chip temperature sensor. As shown in FIG. 1, the temperature sensor circuitry 100 may include analog temperature sensor circuitry 110, biasing circuitry 120, switched-capacitor amplifier circuitry 130, a multiplexer (MUX) 140, an ADC 150, and an integration switch 160.

At a high level, the analog temperature sensor circuitry 110 may provide a plurality of voltages that are indicative of a temperature (e.g., a current operating temperature of the temperature sensor circuitry 100 or the device where the temperature sensor circuitry 100 resides). For instance, the analog temperature sensor circuitry 110 may include one or more current sources 112, one or more switches 114, and a transistor 116 (shown as QP1). The transistor 116 may be a BJT comprising a base (shown by B), an emitter (shown by E), and a collector (shown by C). More specifically, the base and collector of the transistor 116 may be connected to a ground potential, and the emitter of the transistor 116 may be coupled to the current sources 112 via the switches 114. In the illustrated example, the analog temperature sensor circuitry 110 includes nine current sources 112 each generating a unit current represented by lu, and nine corresponding switches 114 shown as S1 to S9. The current sources 112 and the switches 114 can selectively provide a first amount of current and a second amount of current with a known ratio to the transistor 116, thereby causing the transistor 116 to generate a first base-emitter voltage in response the first amount of current and generate a second base-emitter voltage in response the second amount of current. A change in the base-emitter voltages across the transistor 116 may be used for temperature calculation according to the relationship shown in equation (1) above. The known ratio may be N. For instance, the current sources 112 may be matched, where each current source 112 may provide a unit current lu. In an example, the first amount of current may correspond to the unit current lu provided by one current source 112 (with associated switch 114 enabled), and the second amount of current may be N units of current N×lu provided by N current sources 112 (with associated switches 114 enabled).

The switched-capacitor amplifier circuitry 130 may be coupled to the analog temperature sensor circuitry 110 via the integration switch 160. The integration switch 160 may be controlled by an integration signal (e.g., integration signal 220 of FIG. 2) as will be discussed more fully below. The switched-capacitor amplifier circuitry 130 may amplify an incoming signal (e.g., base-emitter voltages output by the analog temperature sensor circuitry when the integration switch 160 is closed) with respect to the common sensor reference voltage instead of amplifying the base-emitter voltages directly to avoid the ADC headroom issues discussed above. As shown, the switched-capacitor amplifier circuitry 130 is disposed upstream of the ADC and may include a single-ended amplifier 136, a first capacitor 132 (shown as Ci), and a second capacitor 134 (shown as Cf). The first capacitor 132 may be coupled between the integration switch 160 and an inverting input (shown by the symbol "−") of the single-ended amplifier 136. The second capacitor 134 may be coupled between the first input and an output of the single-ended amplifier 136. The first capacitor 132 may have a greater capacitance than the second capacitor 134 to provide signal amplification. For instance, the capacitance ratio between the first capacitor 132 and the second capacitor 134 corresponds to the amplification gain.

In some instances, the capacitance ratio between the first capacitor 132 and the second capacitor 134 may be selected to be the same as the current ratio N to allow for a more efficient computation of the temperature as will be discussed more fully below. The common sensor reference voltage (shown as Vbias) may be provided at a non-inverting input (shown by the symbol "+") of the single-ended amplifier 136. As such, the switched-capacitor amplifier circuitry 130 may amplify a difference between the input signal and the common sensor reference voltage Vbias by a gain determined by the capacitance ratio between the first capacitor 132 and the second capacitor 134. As such, the common sensor reference voltage Vbias can be set according to a desirable or suitable headroom for the ADC 150 to provide sufficient amount of amplification for ΔVBE from the temperature sensing transistor 116, but without exceeding the headroom of the ADC 150.

As further shown in FIG. 1, the switched-capacitor amplifier circuitry 130 may include two in-phase sampling switches 138a and 138b, where the switch 138a is coupled between the inverting input and the output of the single-ended amplifier 136 and the switch 138b is coupled between a terminal or plate of the first capacitor 132 and the non-inverting input of the single-ended amplifier 136. The sampling switches 138a and 138b may be controlled by a sampling signal (e.g., sampling signal 210 of FIG. 2) as will be discussed more fully below. The sampling switches 138a and 138b may operate together with the integration switch 160 to provide a sampling phase and an integration phase for operations of the temperature sensor circuitry 100 as will be discussed more fully below with reference to FIGS. 2, 3A-3C, and 4.

The biasing circuitry 120 may generate a common sensor reference voltage Vbias for the switched-capacitor amplifier circuitry 130. The common sensor reference voltage Vbias for the switched-capacitor amplifier circuitry 130 can be generated in a variety of ways, for example, using transistors and/or resistors. However, it may be desirable to utilize a device having similar conduction characteristics and variations with temperature as the temperature sensing transistor 116 in the analog temperature sensor circuitry 110 to generate the common sensor reference voltage. In the illustrated example of FIG. 1, the biasing circuitry 120 utilizes a transistor 126 (a reference transistor QP2) to provide the common sensor reference voltage. In some instances, the reference transistor 126 may be of a same device model as the temperature sensing transistor 116 so that as the temperature varies, the reference transistor 126 may track changes in the temperature sensing transistor 116. To provide the common sensor reference voltage Vbias (a constant voltage), the biasing circuitry 120 may include a current source 122 to inject a third amount of current (e.g., L units of current, L×Iu) into the emitter of the transistor 126. The base and collector of the transistor 126 may be connected to a ground potential. The transistor 126 may generate a third base-emitter voltage in response to the third amount of current, where the third base-emitter voltage may be used as the common sensor reference voltage Vbias as shown by the coupling of the transistor 126's emitter to the non-inverting input of the single-ended amplifier 136. In some instances, L may be greater than N. For instance, L may be 16 based on a desired headroom at the ADC.

The MUX 140 may include inputs coupled to the output of the single-ended amplifier 136 and the emitter of the temperature sensing transistor 116. The MUX 140 can selectively couple the VBE of the temperature sensing transistor 116 or the output of the single-ended amplifier 136 to the ADC for a digital readout. The multiplexing can be based on a selection signal, which may be referred to as a delta signal (e.g., delta signal 230 of FIG. 2). For instance, the MUX 140 may couple the VBE of the temperature sensing transistor 116 to the ADC 150 for a digital conversion for a delta signal with logic low (shown as 0), and may couple the output of the single-ended amplifier 136 to the ADC 150 for a digital conversion for a delta signal with a logic high (shown as 1), or vice versa.

The ADC 150 may perform analog-to-digital conversion according to a reference voltage (shown as VREF). For instance, if VREF is 2.5 V and the ADC 150 has a resolution of 12-bits, the ADC 150 may provide a resolution of 2.5V/4096 for an LSB. The ADC 150 may be any suitable type of ADC, such as a successive approximation (SAR) ADC, a pipelined ADC, or a sigma-delta ADC. The ADC 150 may have any suitable precision or resolution. With the addition of the switched-capacitor amplifier circuitry 130 providing amplification of the ΔVBE in the temperature sensor circuitry 100, the analog temperature sensor circuitry 100 can utilize a lower performance, low resolution, and/or a lower power ADC for the ADC 150, and may still provide a digital ΔVBE with a higher accuracy than utilizing a higher performance and/or higher resolution ADC without ΔVBE amplification. In some instances, the temperature sensor circuitry 100 may utilize a 10-bit ADC for the ADC 150 and may provide a temperature readout with an accuracy of 1 deg C., for example.

In some embodiments, the temperature sensor circuitry 100 may further include other component(s) and/or circuitry, such as an accumulator 170 and/or a processing circuitry 180 to compute an estimate of a current operating temperature of the temperature sensor circuitry 100 based on digital values of amplified VBEs as will be discussed more fully below. The processing circuitry 180 may include hardware logics and gates for computation (e.g., logic and/or arithmetic operations) in a digital domain.

Example Operational Phase of a Temperature Sensor with ΔVBE Amplification

Figure 2:
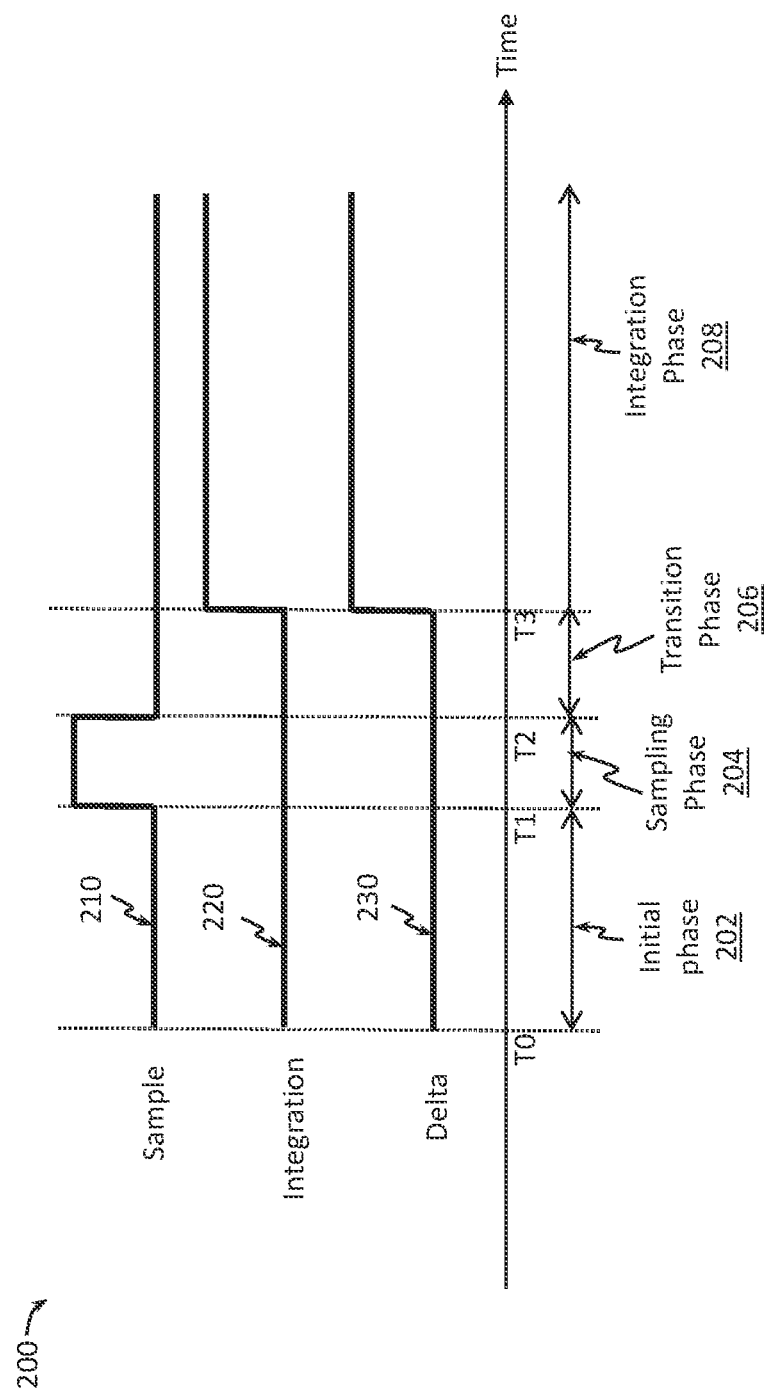
FIG. 2 is a timing diagram of control signals in temperature sensor circuitry, according to some embodiments of the present disclosure.
Figure 3A:
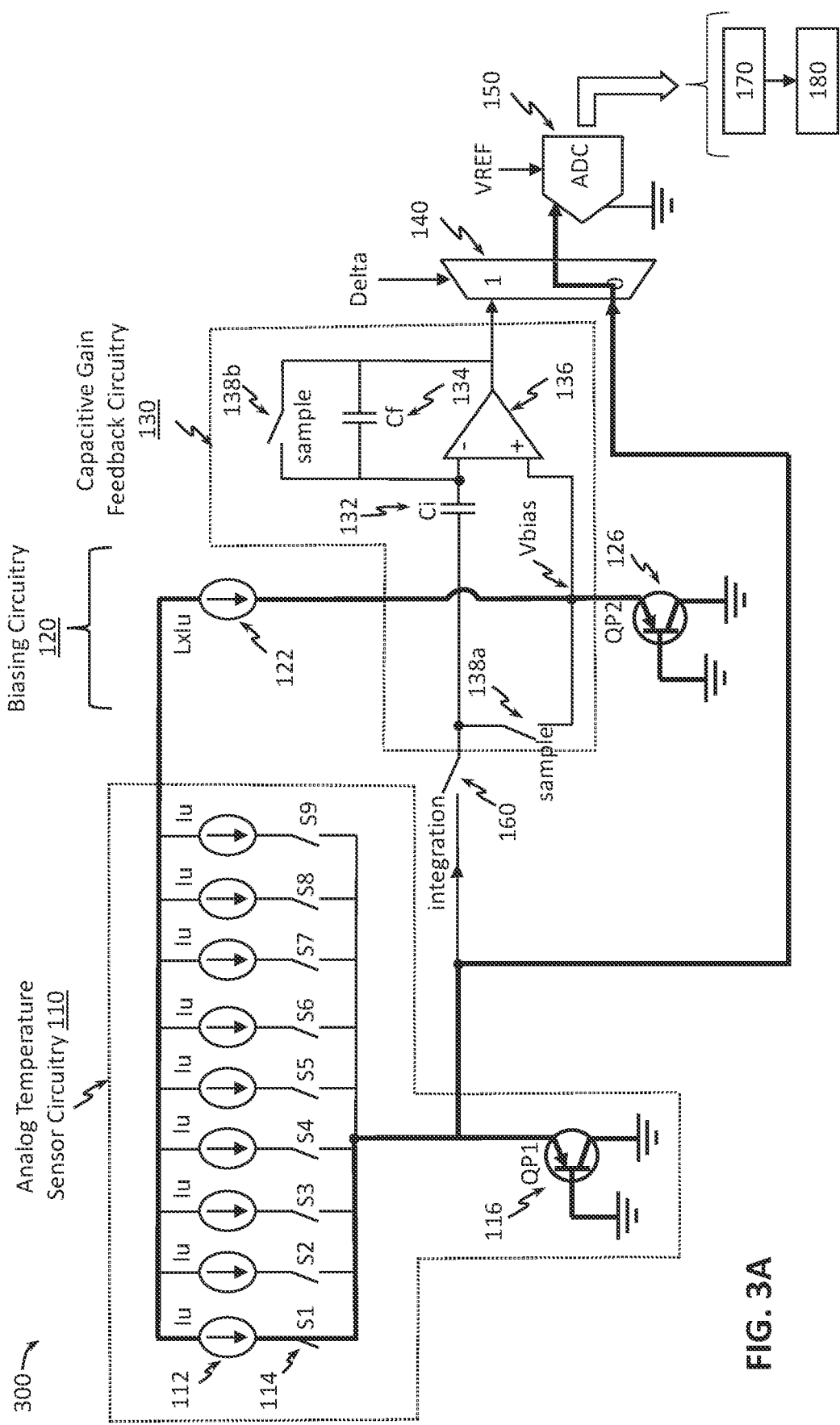
FIG. 3A illustrates operations of temperature sensor circuitry during an initial phase, according to some embodiments of the present disclosure.
Figure 3B:
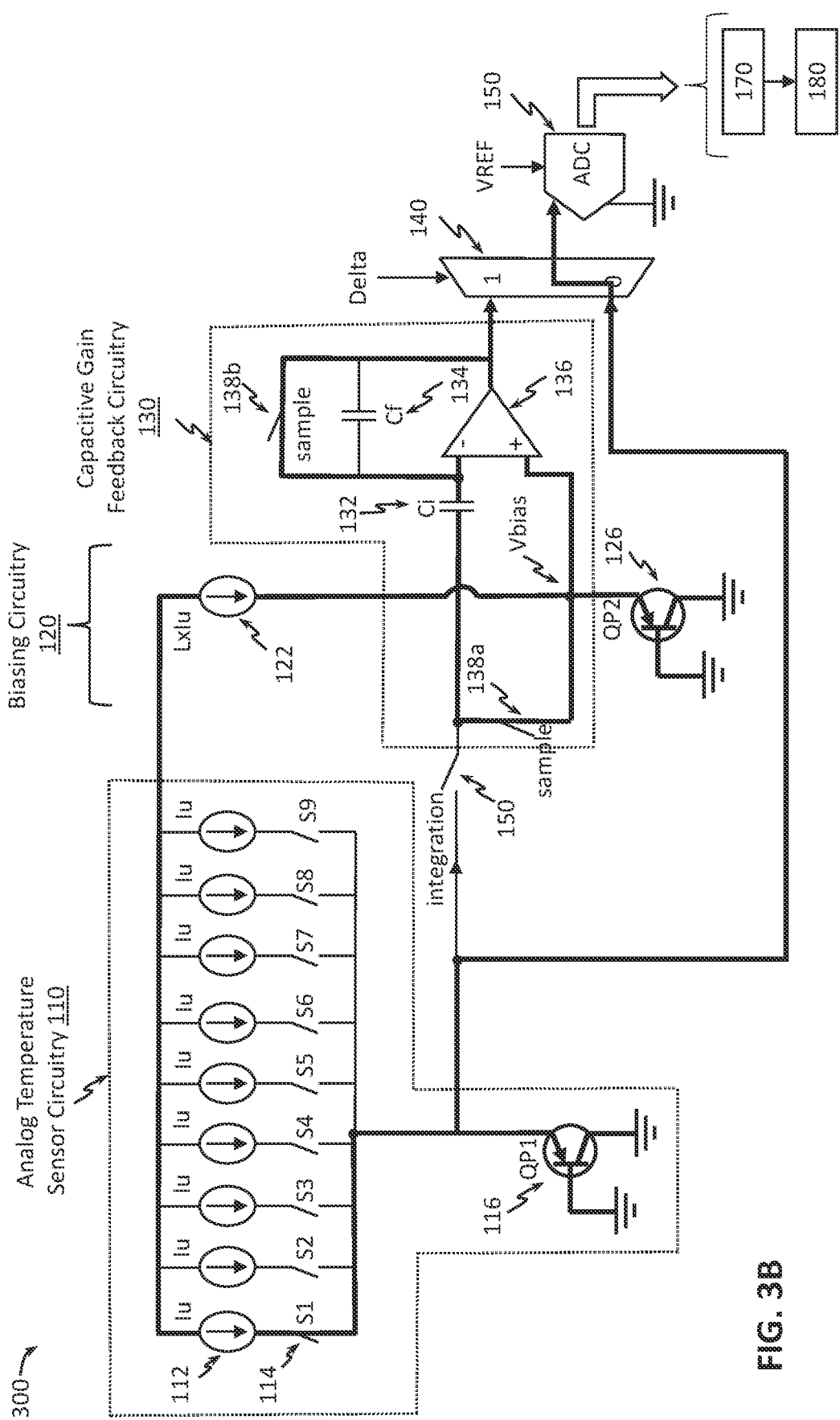
FIG. 3B illustrates operations of temperature sensor circuitry during a sampling phase, according to some embodiments of the present disclosure.
Figure 3C:
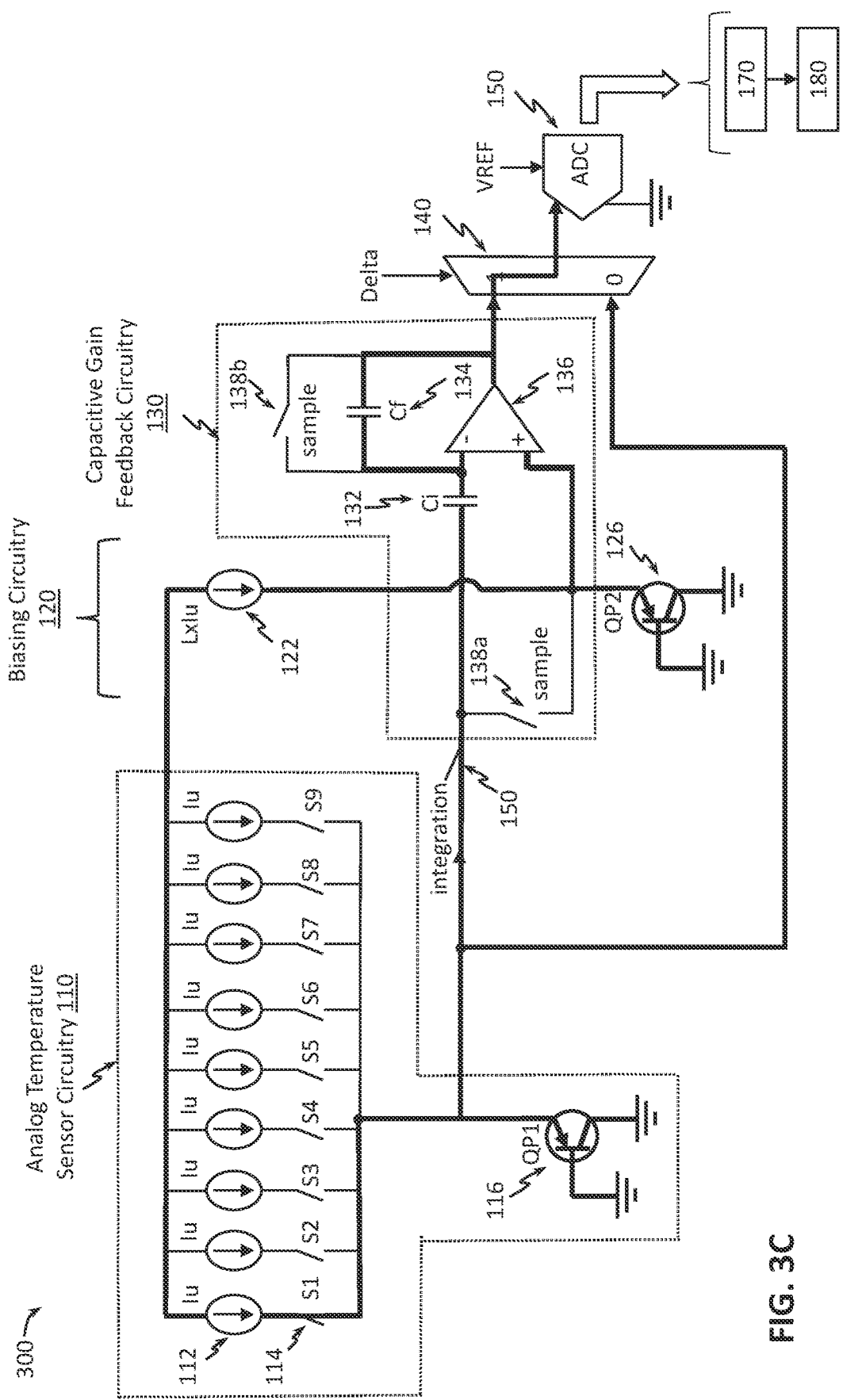
FIG. 3C illustrates operations of temperature sensor circuitry during an integration phase, according to some embodiments of the present disclosure.
Figure 4:
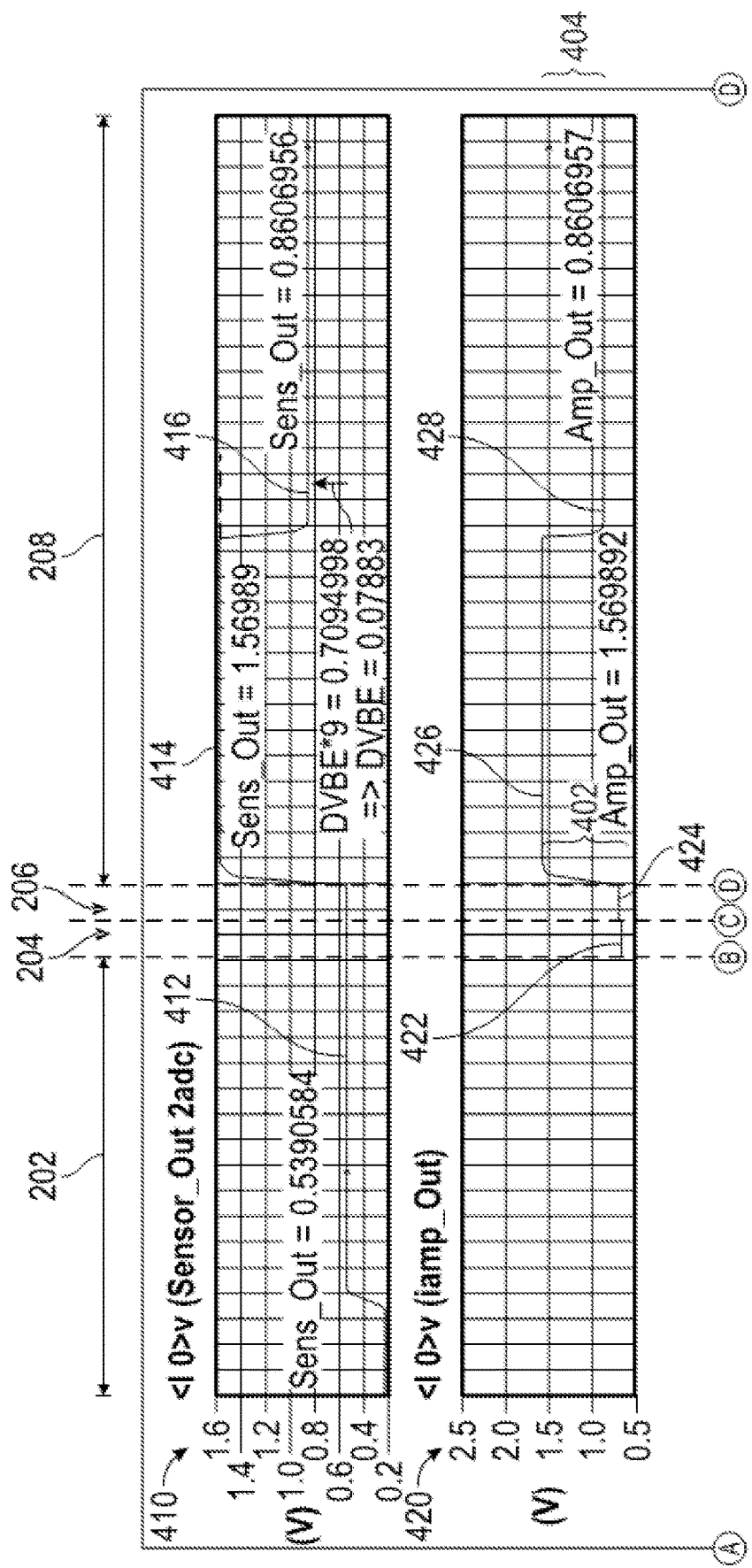
FIG. 4 is a timing diagram of signals in temperature sensor circuitry at various operational phases, according to some embodiments of the present disclosure.
Figure 4:
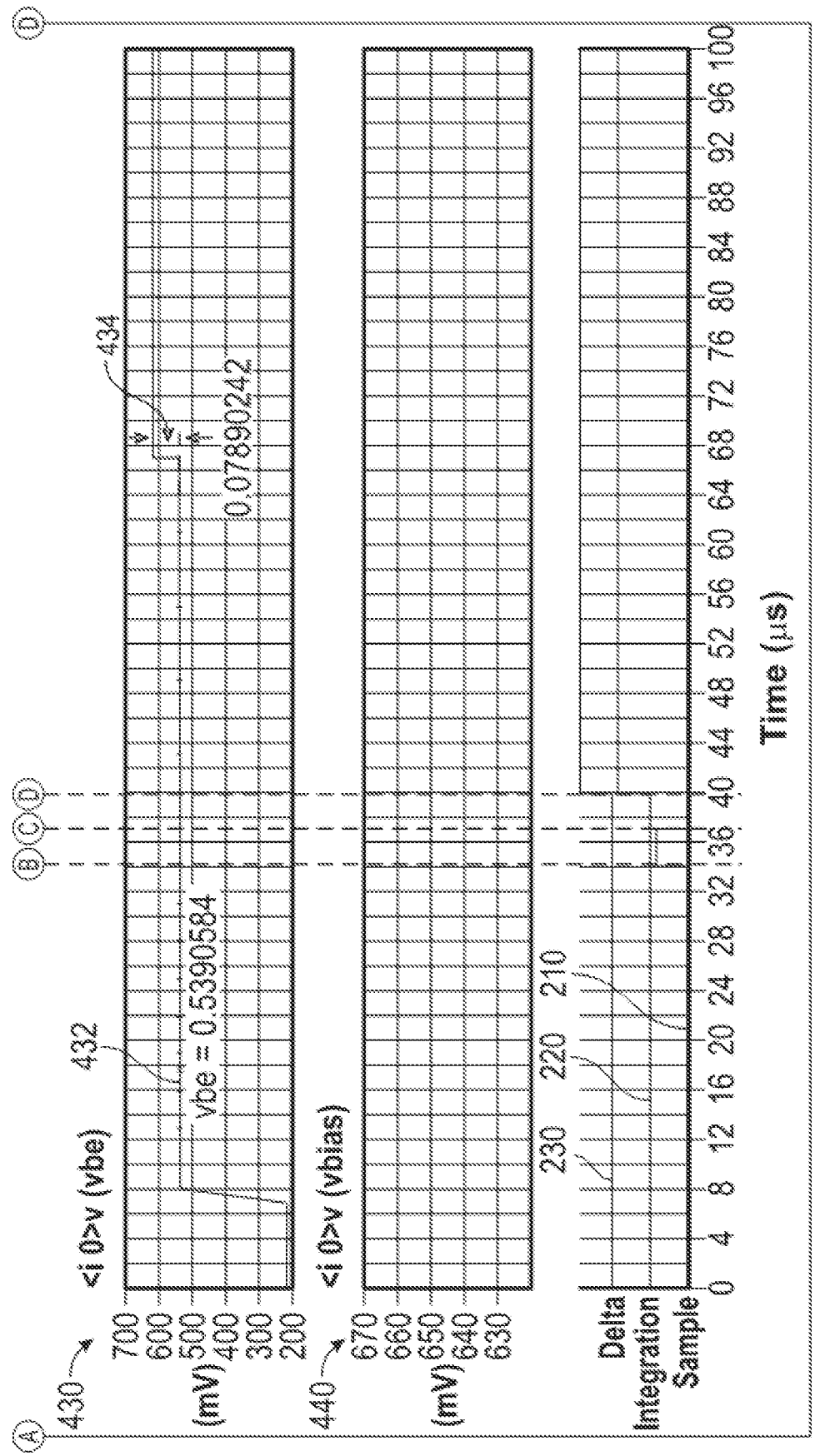

FIGS. 2, 3A-3C, and 4 are discussed in relation to FIG. 1 to illustrate operations of the temperature sensor circuitry 100. For simplicity of discussion, operations of the temperature sensor circuitry 100 discussed below are for N set to 9. However, N may be scaled up or down to any suitable values (e.g., 2, 3, 4, 5, 6, 7, 8, 10, 11, 12, or more) as supported by the temperature sensor circuitry 100. FIG. 2 is a timing diagram of control signals and operational phases in the temperature sensor circuitry 100, according to some embodiments of the present disclosure. In FIG. 2, the x-axis may represent time in some arbitrary units. FIGS. 3A-3C illustrate operational flow 300 in the temperature sensor circuitry 100. FIG. 3A illustrates operations of the temperature sensor circuitry 100 during an initial phase 202, according to some embodiments of the present disclosure. FIG. 3B illustrates operations of the temperature sensor circuitry 100 during a sampling phase 204, according to some embodiments of the present disclosure. FIG. 3C illustrates operations of the temperature sensor circuitry 100 during an integration phase 208, according to some embodiments of the present disclosure. In FIGS. 3A-3C, the thick black lines indicate closed or selected circuit paths. FIG. 4 is a timing diagram of signals in the temperature sensor circuitry 100 at various operational phases (e.g., the phases 202, 204, 206, and/or 208), according to some embodiments of the present disclosure.

Referring to FIG. 2, operations of the temperature sensor circuitry 100 may include an initial phase 202 (from time T0 to T1), a sampling phase 204 (from time T1 to T2), a transition phase 206 (from time T2 to T3), and an integration 208 (from time T3 onwards). The phases 202, 204, 206, and 208 may be controlled by a sampling signal 210 operating the sampling switches 138a and 138b of FIG. 1, an integration signal 220 operating the integration switch 160 of FIG. 1, and a delta signal 230 operating the MUX 140 of FIG. 1. The sampling signal 210 may control (e.g., open/close) the sampling switches 138a and 138b of FIG. 1. The integration signal 220 may control (e.g., open/close) the integration switch 160. The delta signal 230 may control multiplexing at the MUX 140.

FIG. 3A illustrates operations during the initial phase 202. As shown in FIG. 3A, the integration switch 160 and the sample switches 138a and 138b are opened based on the integration signal 220 and the sampling signal 210 being a logic low (shown in FIG. 2). During the initial phase 202, each of the current source 112 may provide a first amount of current Iu to the temperature sensing transistor 116 one by one to cause a first base-emitter voltage across the transistor 116. More specifically, each of the switch 114 may be enabled (closed) sequentially one at a time in a sweeping manner. For example, at a first time instant, the switch 114 S1 may be closed to provide a unit current Iu and a corresponding first base-emitter voltage may be sent to the ADC 150 via the MUX 140 (bypassing the switched-capacitor amplifier circuitry 130 based on the delta signal 230 being low) for a digital readout (e.g., represented by $CVBE_1(1)$) as shown in FIG. 3A. Next, at a second time instant, the switch 114 S2 may be closed to provide a unit current Iu and a corresponding first base-emitter voltage may be sent to the ADC 150 via the MUX 140 for a digital readout (e.g., represented by $CVBE_1(2)$). Next, at a third instant, the switch 114 S3 may be closed to provide a unit current Iu and a corresponding first base-emitter voltage may be sent to the ADC 150 via the MUX 140 for a digital readout (e.g., represented by $CVBE_1(3)$), and so on. This may continue until all the nine current sources 112 have been enabled once to provide a first amount of current Iu to the transistor 116. Each digital readout $CVBE_1(i)$ may be sent to the accumulator 170 for accumulation. For simplicity of illustration, only the activation (closing) of the switch 114 S1 is shown in FIG. 3A, and the sweeping across the other switches 114 S2 to S9 are not shown. In general, the switches 114 may be enabled in any order.

The temperature sensor circuitry 100 may accumulate, in the accumulator 170, the nine digital values each corresponding to a digital representation of a base-emitter voltage of the transistor 116 in response to a unit current Iu. The accumulated value, CVBE, may be expressed as shown below:

$$CVBE = \Sigma_{i=1}^{9} CVBE_1(i). \quad (2)$$

In some embodiments, the current sources 112 may be matched current sources. However, due to imperfection in process, the current sources 112 may vary. Utilizing each current source 112 to generate a unit current Iu and accumulating $CVBE_1(i)$ for i varying from 1 to 9 can average out differences among the current sources 112. This process may be referred to as dynamic element matching. In some embodiments, the obtained $CVBE_1(i)$ with the switched-capacitor amplifier circuitry 130 being bypassed may be used for digital bandgap reference calculation as will be discussed more fully below. In some instances, the initial phase 202 may be omitted.

In some embodiments, the biasing circuitry 120 may be active throughout the initial phase 202 as shown in FIG. 3A. However, in other embodiments, the biasing circuitry 120 can be activated after the initial phase 202.

Returning to FIG. 2, after the initial phase 202, the sampling signal 210 may provide a sampling pulse to start the sampling phase 204. FIG. 3B illustrates operations during the sampling phase 204. As shown in FIG. 3B, the integration switch 160 remains opened based on the integration signal 220 is a logic low and the sampling switches 138a and 138b are closed based on the sampling pulse (logic high) provided by the sampling signal 210. The sampling pulse resets the integrator (e.g., amplifier 136, the capacitors 132 and 134 arrangement) and shorts the integrator output (e.g., the amplifier 136 output) to the common sensor reference voltage Vbias (generated by the reference transistor 126 of the bias circuitry 120) at the non-inverting input of the single-ended amplifier 136. Accordingly, the sampling phase 204 provides a sampling of the common sensor reference voltage Vbias. Further, since the delta signal 230 remains a logic low, the output of the amplifier 136 is not sent to the ADC 150 by the MUX 140.

Returning to FIG. 2, after the sampling phase 204, the sampling pulse is released (the sampling signal 210 returns to a logic low) and the integration signal 220 may remain low to provide the transition phase 206. During the transition phase 206 (i.e., while the integration switch 160 and the sampling switches 138a and 138b are opened), there may be a disturbance at the output of single-ended amplifier 136, for example, due to charge injection at the capacitors 132 and 134. As an example, the output of the single-ended amplifier 136 may settle at a voltage Vbias+Ve, where Ve may include error due to charge injection and/or an inherent offset of the switched-capacitor amplifier circuitry 130 as will be discussed more fully below with reference to FIG. 4. This transition phase 204 allows for any disturbance in the switched-capacitor amplifier circuitry 130 (due to the opening of the sampling switches 138a and 138b) to settle prior to temperature sensing in the subsequent integration phase 208. As will be shown further below, the absolute voltage level of Vbias+Ve (a baseline) may not be important as all voltage measurements for temperature calculation are based on voltage changes thereafter. That is, subsequent calculations are based on changes from this baseline which includes charge injection errors. Further, the sampling switches 138a and 138b may remain opened for the remaining of the temperature sensing process and the integration switch 160 will remain closed once the integration phase 208 begins. That is, there is no more switch opening/closing once the integration phase 208 begins. As such, there is no charge injection error or offset changes during the integration phase 208. Accordingly, no specific or additional circuitry is required to correct for error and/or offset in the switched-capacitor amplifier circuitry 130.

After the transition phase 206, the integration signal 220 is toggled to a logic high and the delta signal 230 is toggled to a logic high to start the integration phase 208. The sampling signal 210 may remain low to provide the integration phase 208. FIG. 3C illustrates operations in the integration phase 208. As shown in FIG. 3C, the integration switch 160 is closed based on the integration signal 220 is a logic high and the sampling switches 138a and 138b remain opened.

During the integration phase 208, temperature sensing may be performed. For instance, each of the current source 112 in the analog temperature sensor circuitry 110 may be turned on one by one (via corresponding switches 114) to provide a respective first amount of current (e.g., a unit current I) to the temperature sensing transistor 116. The transistor 116 may generate a respective first base-emitter voltage, represented by $VBE_1(i)$ in response to each first amount of current received from a current source 112 coupled via a switch 114 S(i) where i may vary from 1 to 9. Since the integration switch 160 is closed, the switched-capacitor amplifier circuitry 130 may receive each first base-emitter voltage $VBE_1(i)$ at the inverting input of the amplifier 136 and amplify each first base-emitter voltage $VBE_1(i)$ with respect to the common sensor reference voltage Vbias. The amplified first base-emitter voltage (amplified with respect to Vbias) at the output of the amplifier 136 may be represented by:

$$Vout1(i) = Vbias + Ve + 9 \times (Vbias - VBE_1(i)), \quad (3)$$

where $Vout1(i)$ represents the amplified first base-emitter voltage responsive to a single i-th current source 112 turned on and the terms Vbias+Ve may be the initial voltage at the output of the amplifier 136 at the start of the integration phase 208. The switched-capacitor amplifier circuitry 130 may amplify a difference between the common sensor reference voltage Vbias and each first base-emitter voltage $VBE_1(i)$. The amplification gain may be based on the capacitance ratio between the capacitor 132 and 134 (which may be set to 9 to match N to simplify subsequent temperature calculation). The terms $9 \times (Vbias - VBE_1(i))$ correspond to the amplification of $VBE_1(i)$ with respect to the common sensor reference voltage Vbias. Since the delta signal 230 is a logic high, the MUX 140 may send $Vout1(i)$ to the ADC 150 for analog-to-digital conversion. The ADC 150 may output a first digital value, which may be represented by $CVBE_1'(i)$, for each $Vout1(i)$. The 9 readouts (first digital values) can be accumulated at the accumulator 170 of the temperature sensor circuitry 100. The accumulated value (e.g., a third digital value) may be represented by $\Sigma_{i=1}^{i=9} CVBE_1'(i)$ or simply as $CVBE_{acc}$, which is a digital representation of $\Sigma_{i=1}^{i=9} Vout_1(i)$.

Next, all of the 9 current sources 112 may be turned on at the same time (e.g., closing all switches 114 S1 to S9) to provide a second amount of current (9×1u) to the temperature sensing transistor 116, and the transistor 116 may generate a second base-emitter voltage, which may be referred to as $VBE_9$. The switched-capacitor amplifier circuitry 130 may receive the second base-emitter voltage $VBE_9$ at the inverting input of the amplifier 136 and amplify the second base-emitter voltage $VBE_9$ with respect to the common sensor reference voltage Vbias. The amplified second base-emitter voltage (amplified with respect to Vbias) at the output of the amplifier 136 may be represented by:

$$Vout2 = Vbias + Ve + 9 \times (Vbias - VBE_9), \quad (4)$$

where Vout2 represents the amplified second base-emitter voltage responsive to all 9 current sources 112 turned on and the terms Vbias+Ve may be the initial voltage at the output of the amplifier 136 at the start of the integration phase 208. In a similar way as the amplifying of the $VBE_1(i)$, the switched-capacitor amplifier circuitry 130 may amplify a difference between the common sensor reference voltage Vbias and the second base-emitter voltage $VBE_9$ as shown by the terms $9 \times (Vbias - VBE_9)$. The MUX 140 may send Vout2 to the ADC 150 for analog-to-digital conversion. The ADC 150 may output a second digital value, which may be represented by $CVBE_9'$.

The temperature sensor circuitry 100 may utilize the processing circuitry 180 to compute an amplified $\Delta VBE$ digitally by subtracting the third digital value $CVBE_{acc}$ from the second digital value $CVBE_9'$ and may subsequently compute a measurement of a current operating temperature of the temperature sensor circuitry 100. As can be observed from equations (3) and (4) above, the subtraction eliminates the terms Vbias+Ve, providing an amplified $\Delta VBE$ as show below:

$$9 \times \left( VBE_9 - \frac{\sum_{i=1}^{i=9} VBE_1(i)}{9} \right) = 9 \times \Delta VBE. \quad (5)$$

As can be further observed, because the amplification gain of the switched-capacitor amplifier circuitry 130 is 9 and the current ratio between the first amount of current and the second amount of current is also 9, the amplified $\Delta VBE$ can be obtained without dividing $CVBE_{acc}$ (e.g., $\Sigma_{i=1}^{i=9} VBE_1(i)$) by 9. Stated differently, by setting the amplification gain to be the same as the current ratio (e.g., N), the arithmetic computation can be simplified. However, in general, the amplification gain and the current ratio can be any suitable values. Further, in some embodiments, $$\frac{\sum_{i=1}^{i=9} VBE_1(i)}{9}$$

can be approximated by sweeping 8 of the current sources 112 to obtain $$\frac{\sum_{i=1}^{i=8} VBE_1(i)}{8}.$$

As explained above, the role of the common sensor reference voltage Vbias generated by the reference transistor 216 is to keep the output of the amplifier 136 to be within the headroom of the ADC 150 and in a way to allow amplification of VBE without the output of the amplifier 136 going above the voltage rail (e.g., VREF of the ADC 150). In an example, the current source 212 that provides the third amount of current (L×1u) with L being 16. That is, the common sensor reference voltage Vbias may correspond to the base-emitter voltage of the transistor 216 with 16 units of current. As such, the voltage $Vbias - VBE_1(i)$ (amplified by the switched-capacitor amplifier circuitry 130) may be approximately equal to $(kB \times T/q) \times \ln(16)$ and the voltage $Vbias - VBE_9$ (amplified by the switched-capacitor amplifier circuitry 130) may be approximately equal to $(kB \times T/q) \times \ln(4/3)$.

While the operations in the integration phase 208 are described in the order of tuning each current source 112 on one by one to obtain a respective first base-emitter voltage at the temperature sensing transistor 116, followed by turning on all 9 current sources 112 to obtain a second base-emitter voltage at the temperature sensing transistor 116, aspects are not limited thereto. For instance, the order may be reversed by turning on all 9 current sources 112 to obtain a second base-emitter voltage, followed by tuning on each current source 112 one by one to obtain a respective first base-emitter voltage. In general, the current sources 112 may be turned on in any suitable order.

FIG. 4 is a timing diagram of exemplary voltage signals and control signals in the temperature sensor circuitry 100, according to some embodiments of the present disclosure. In FIG. 4, the plot 410 shows the voltage output to the ADC 150 in units of V across time. The plot 420 shows the voltage at the output of the switched-capacitor amplifier circuitry 130 in units of V across time. The plot 430 shows the base-emitter voltage VBE of the temperature sensing transistor 116 in units of mV across time. The plot 440 shows the common sensor reference voltage Vbias in units of mV across time. The voltages shown may be taken at a certain temperature (e.g., at about 125 deg C.). The delta signal 230, the integration signal 220, and the sampling signal 210 of FIG. 2 are repeated in FIG. 4 to illustrate the different voltage signals across the different operational phases 202, 204, 206, and 208.

During the initial phase 202, the base-emitter voltages of the transistor 116 may be about 0.539 V (shown by 432), for example, corresponding to the $VBE_1(i)$ to $VBE_9(i)$ of the transistor 116 without any amplification. The same voltage is shown by 412 which is to be output to the ADC 150.

During the sampling phase 204, the voltage at the output of the switched-capacitor amplifier circuitry 130 may be about 0.64 V (shown by 422) corresponding to the base-emitter voltages of the reference transistor 216 in response to the 16×Iu. That is, the common sensor reference voltage Vbias is about 640 mV (shown by 442), which is constant throughout the phases 202, 204, 206, and 208.

During the transition phase 206, the voltage at the output of the switched-capacitor amplifier circuitry 130 may have a slight increase from the 0.64 V (shown by 424) due to the charge injection and/or inherent offset in the switched-capacitor amplifier circuitry 130 as discussed above. For example, the output of the switched-capacitor amplifier circuitry 130 may correspond to Vbias+Ve.

During the integration phase 208, the voltage at the output of the switched-capacitor amplifier circuitry 130 may increase to about 1.56 V (shown by 426), for example, when the current sources 112 are each turned on one by one. That is, the increased voltage 402 may correspond to 9×(Vbias−$VBE_1(i)$) with i varying from 1 to 9. The same voltage 1.56 V may be sent to the ADC 150 for a digital readout as shown by 414. At a later time, the voltage at the output of the switched-capacitor amplifier circuitry 130 may drop to about 0.86 V (shown by 428), for example, when all 9 current sources 112 are turned on. That is, the decreased voltage 404 may correspond to 9×(Vbias−$VBE_9$)−9×(Vbias−$VBE_1(i)$), which is the 9× amplified ΔVBE (e.g., shown in equation (5) above). The output (e.g., the 0.86V) of the switched-capacitor amplifier circuitry 130 may be sent to the ADC 150 for a digital readout as shown by 416. The ΔVBE without the amplification is shown by 434. As can be seen, the ΔVBE without the amplification is about 0.078 V (shown by 434), and the amplified ΔVBE is about 0.709 V (shown by 404). That is, the ΔVBE is amplified by about 9 times.

Example Digital Banc/Gap Reference and Digital Curvature Correction

As explained above, it may be desirable to decouple the ADC reference voltage VREF from the digital readings (e.g., the first digital values $CVBE_1'$ and the second digital value $CVBE_9'$) since variation in VREF can provide inaccurate digital readings impacting the temperature measurement. In an embodiment, a digital bandgap reference may be used in place of the ADC reference voltage VREF. A bandgap voltage may be represented by $VBE_1+K \times \Delta VBE$. Since VBE is CTAT and ΔVBE is PTAT, an appropriate K value may be found such that the bandgap voltage is constant across temperatures, and thus may be used as a reference in place of the absolute analog VREF. As an example, the digital representation D1 of the amplified ΔVBE with respect to arbitrary analog VREF can be as expressed below:

$$D1 = \left(\frac{9 \times \Delta VBE}{VREF}\right) \times 2^R, \quad (6)$$

where R is the number of bits provided by the ADC 150, and the digital bandgap reference DREF based on the digital bandgap voltage may be expressed as shown below:

$$DREF = \left(\frac{VBE_1 + K \times \Delta VBE}{VREF}\right) \times 2^R. \quad (7)$$

The value D1 can be expressed in terms of DREF based on equation (6) and equation (7) to remove the dependency on the analog reference term VREF. Further, the temperature for ΔVBE may be computed from the amplified ΔVBE digital bandgap reference as shown below:

$$T = \left(\frac{M \times (\Delta VBE \times 9)}{\sum_{i=1}^{i=9} CVBE_1(i) + K \times (\Delta VBE \times 9)}\right) \pm \text{offset}, \quad (8)$$

where M may be a value that includes the Boltzmann's constant kB, the charge of the electron q, and the term ln(N) of equation (1) used for the temperature computation, and the offset may be a trimmed value that is device-specific and independent of a temperature.

In an embodiment, a post-production calibration procedure may be performed to find a value K that provides a constant with temperature bandgap reference $VBE_1+K \times \Delta VBE$, for example, at two end temperatures of a range of operating temperatures supported by the device. In an embodiment, the end temperatures can be at −40 deg C. and 125 deg C. Subsequently, the denominator of equation (8) may be computed and an inverse of the denominator may be stored in a memory (e.g., a non-volatile memory (NVM) or a register that can be read during runtime) of the temperature sensor circuitry 100 device. Accordingly, during runtime, instead of performing a division (which may be costly in terms of power and area), a multiplication by the stored calibration value (including the inverse of the digital bandgap reference) may be performed. The post-production calibration procedure may also determine the offset value for the device and the temperature offset value may be stored in the memory. In some embodiments, post-production calibration procedure may also calibrate the value M, which can vary from part-to-part. An exemplary calibration process is discussed more fully below with reference to FIG. 8.

Figure 5:
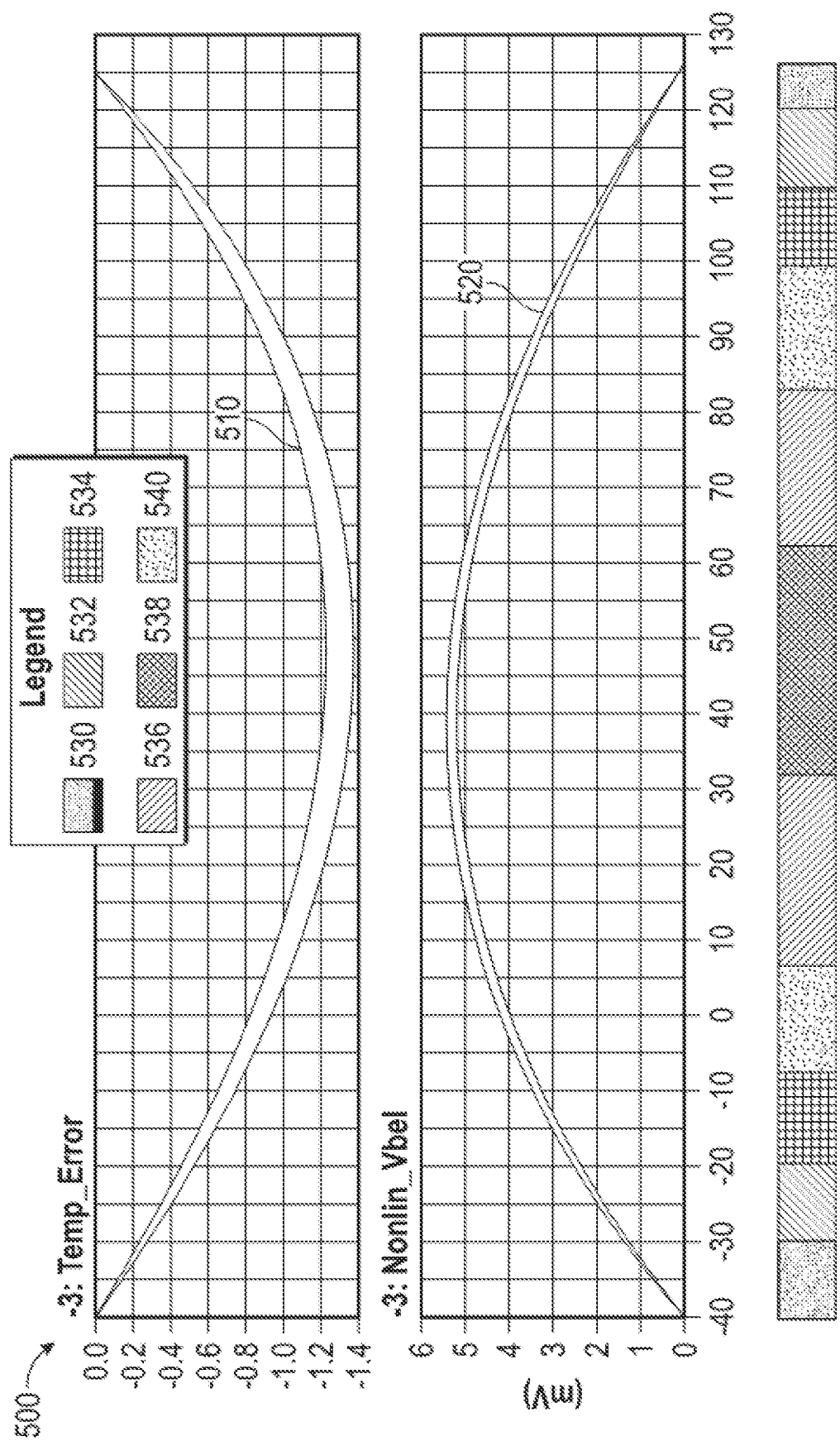
FIG. 5 is a graphical representation of digital curvature error and correction associated with temperature sensor circuitry, according to some embodiments of the present disclosure.

In an embodiment, the digital bandgap reference $VBE_1+K \times \Delta VBE$ may vary within the range of temperatures from −40 deg C. to 125 deg C. due to bandgap voltage nonlinearity. FIG. 5 is a graphical representation 500 of digital curvature error and correction associated with temperature sensor circuitry such as the temperature sensor circuitry 100, according to some embodiments of the present disclosure. In FIG. 5, the top curve 510 shows errors in the VBE-to-temperature conversion error in units of deg C. as a function of temperature. As can be observed from the curve 510, there is an error of about 2 degrees in the temperature conversion. This error may be due to VBEs of the transistor may not vary linearly with temperatures. The bottom curve 520 shows variations of base-emitter voltages of a BJT (e.g., the transistor 116 and/or the transistor 126) from −40 deg C. to 125 deg C. in units of mV as a function of temperatures.

The errors shown in the curve 510 may be predictable across parts. Accordingly, a temperature-dependent compensation value can be determined and added to a temperature estimate. In an embodiment, compensation for the VBE-to-temperature conversion error can be partitioned into multiple temperature sub-ranges and a temperature compensation value may be determined for each sub-range according to the curve 510. For example, a compensation value 530, 532, 534, 536, 538, and 540 may be applied to a respective temperature sub-range as shown in FIG. 5. In an example, the compensation values 530, 532, 534, 536, 538, and 540 may correspond to 0, 0.25, 5, 0.75, 1.0, and 1.25, respectively. Accordingly, the temperature computed from equation (8) may be adjusted (by a correction value selected from 530, 532, 534, 536, 538 and 540 depending on the temperature. As an example, if the temperature T calculated from equation (8) is 20 deg C., the compensation value 536 may be added to T. As another example, if the temperature T from calculated from equation (8) is 115 deg C., no compensation may be applied since the compensation value 530 for the sub-range including 115 deg C. is 0. Accordingly, temperature-dependent compensation values (e.g., 530, 532, 534, 536, 538 and 540) can be stored at a memory (e.g., NVM) of the temperature sensor circuitry 100, or hardcoded based on simulations and a correction value can be selected from the stored temperature-dependent compensation values at runtime for adjusting or correcting the temperature value computed from equation (8) digitally. Accordingly, analog circuitry that are typically used for the VBE(T) curvature correction can be omitted, saving power and die area. Furthermore, the digital VBE(T) curvature correction has a distinct advantage over the analog correction techniques. For instance, the digital VBE(T) curvature correction can utilize knowledge of approximate temperature (such as to a precision of 2 deg C.) for the correction.

Figure 6:
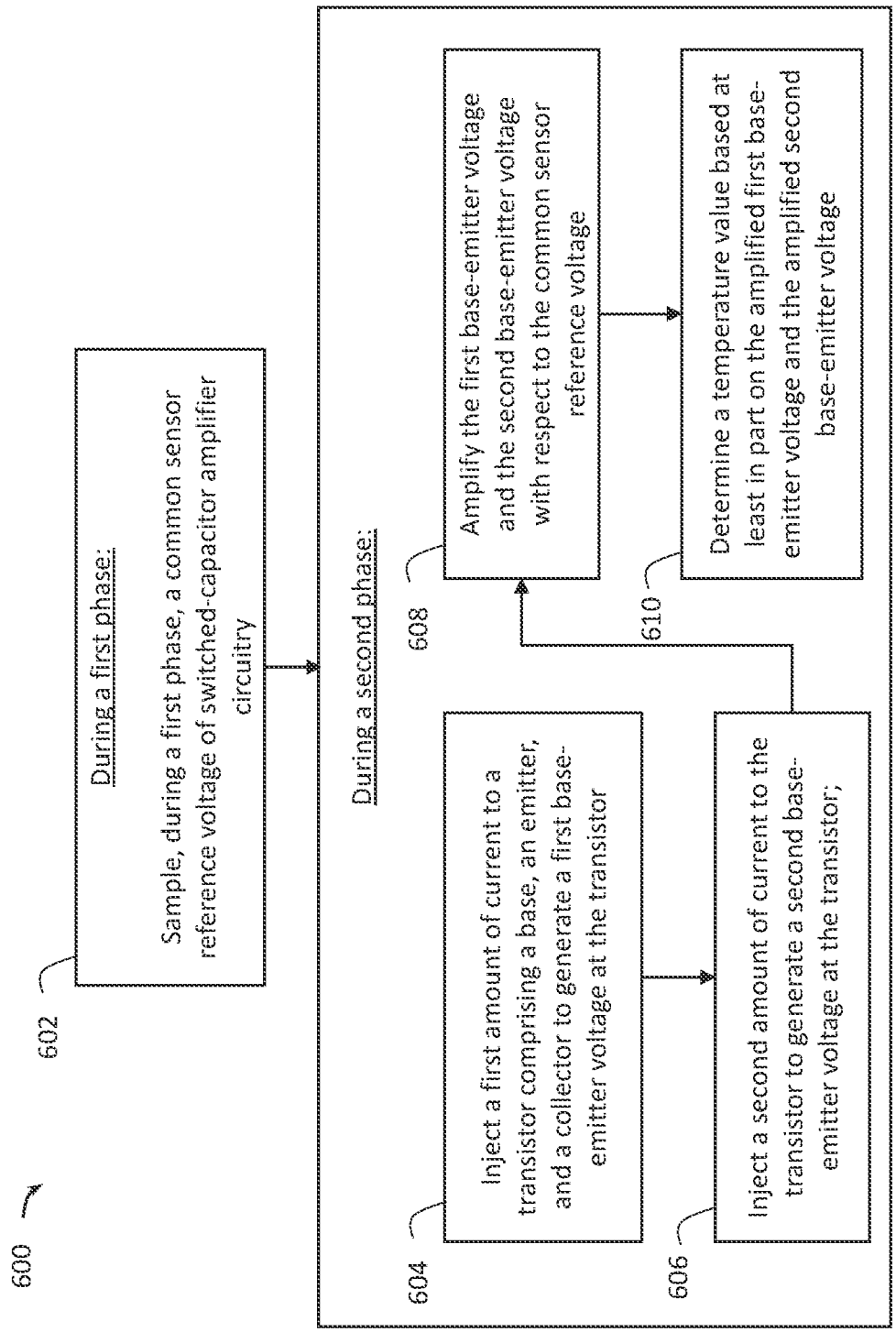
FIG. 6 is a flow diagram illustrating an exemplary method for measuring a temperature in an integrated circuit device, according to some embodiments of the present disclosure.

FIG. 6 is a flow diagram illustrating an exemplary method 600 for measuring a temperature in an integrated circuit device, according to some embodiments of the present disclosure. The method 600 can be implemented by a temperature measurement system, for example, within an integrated circuit device such as a temperature sensor, a microcontroller, and/or wireless radio transceiver chips. Although the operations of the method 600 may be illustrated with reference to particular embodiments of the temperature sensor circuitry 100 disclosed herein, the method 600 may be performed using any suitable hardware components and/or software components. Operations are illustrated once each and in a particular order in FIG. 6, but the operations may be performed in parallel, reordered, and/or repeated as desired.

At 602, during a first phase, a common sensor reference voltage of switched-capacitor amplifier circuitry is sampled. For instance, the temperature measurement system be similar to the temperature sensor circuitry 100. The first phase may correspond to the sampling phase 204 discussed above with reference to FIG. 2, FIG. 3B, and FIG. 4. The switched-capacitor amplifier circuitry may correspond to the switched-capacitor amplifier circuitry 130. The common sensor voltage may correspond to Vbias at the non-inverting input of the single-ended amplifier 136. The sampling switches 138a and 138b may be closed to enabling sampling of the common sensor voltage.

During a second phase, the method 600 may perform operations of 604, 606, 608, and 610. In some instances, the second phase may correspond to the integration phase 208 discussed above with reference to FIG. 2, FIG. 3C, and FIG. 4.

At 604, a first amount of current is injected into a transistor to generate a first base-emitter voltage at the transistor. The transistor may be part of analog temperature sensor circuitry of the temperature measurement system and the first amount of current may be generated by a current source in the analog temperature sensor circuitry. In some instances, the transistor may correspond to the temperature sensing transistor 116 in the analog temperature sensor circuitry 110. The first amount of current may correspond to a unit current lu and may be generated by a current source 112 of the analog temperature sensor circuitry 110.

At 606, a second amount of current is injected into the transistor to generate a second base-emitter voltage at the transistor. In some instances, the second amount of current may correspond to N unit current N×lu and may be generated by N number of current sources in the analog temperature sensor circuitry of the temperature measurement system.

At 608, the first base-emitter voltage and the second base-emitter voltage are amplified with respect to the common sensor reference voltage by the switched-capacitor amplifier circuitry.

At 610, a temperature value is determined based at least in part on the amplified first base-emitter voltage and the amplified second base-emitter voltage.

In some embodiments, the method 600 may further include injecting a third amount of current into another transistor to generate a third base-emitter voltage at the other transistor. The other transistor may be coupled to an input of single-ended amplifier in the switched-capacitor amplifier circuitry. The third amount of current may correspond to L unit current L×lu generated by a current source 122 of the bias circuitry. The common sensor reference voltage at 602 may correspond to the third base-emitter voltage. In some instances, the transistor may be part of biasing circuitry of the temperature measurement system. In some instances, the other transistor may correspond to the reference transistor 126 in the biasing circuitry 120. The third amount of current may correspond to L unit current L×lu generated by the current source 122 in the biasing circuitry 120.

In some embodiments, as part of injecting the first amount of current to the transistor at 604, N instances of the first amount of current may be injected into the transistor to generate a respective first base-emitter voltage at the transistor for each instance, where N is an integer greater than 1, and the second amount of current may be N times the first amount of current. Further, as part of amplifying the first base-emitter voltage and the second base-emitter voltage at 608, each of the first base-emitter voltages may be amplified with respect to the common sensor reference voltage by the switched-capacitor amplifier circuitry. In some further embodiments, as part of injecting the first amount of current to the transistor at 604, each of the N instances of the first amount of current may be generated by a different one of a plurality of current sources, for example, by turning on each of the plurality of current sources one by one to generate a respective first base-emitter voltage at the transistor. Further, as part of injecting the second amount of current to the transistor at 606, the second amount of current may be generated by all of the plurality of current sources, for example, by turning all of the plurality of current sources at the same time.

In some embodiments, as part of determining the temperature value at 610, each of the first base-emitter voltages may be converted via an ADC to a respective first digital value and the second base-emitter voltage may be converted via the ADC to a second digital value by an ADC. The ADC may be part of the temperature sensor system. In some instances, the ADC may correspond to the ADC 150. Further, the first digital values may be accumulated at an accumulator (e.g., the accumulator 170) of the temperature measurement system to generate a third digital value. Further, the third digital value may be subtracted from the second digital value to generate a fourth digital value indicative of an amplified base-emitter difference voltage difference. The fourth digital value may be multiplied by a predetermined scaling factor associated with at least an inverse of a digital bandgap reference to produce a fifth digital value. In some instances, the computation of the third digital value and the fourth digital value may be performed by processing circuitry (e.g., the processing circuitry 180) of the temperature measurement system. In some instances, the digital band gap reference may correspond to the denominator of equation (8). In some instances, the predetermined scaling factor may also include the M value in the numerator of equation (8). In some embodiments, the predetermined scaling factor associated with at least the inverse of a digital bandgap reference may be a calibration value obtained during a post-production calibration procedure and stored at a memory temperature measurement system as discussed below with reference to FIG. 8. Accordingly, the method 600 may further include reading the predetermined scaling factor associated with at least an inverse of a digital bandgap reference from the memory. In some embodiments, the method 600 may further include adjusting the temperature value by a temperature-dependent digital compensation value (e.g., associated with the VBE(T) curvature) discussed above with reference to FIG. 5. The temperature-dependent digital compensation value may correspond to one of the compensation values 530, 532, 534, 536, 538, or 540 discussed above with reference to FIG. 5. In some embodiments, the method 600 may further include selecting, from a plurality of temperature-dependent digital compensation values, the predetermined temperature-dependent digital compensation value. The plurality of temperature-dependent digital compensation values may be stored at the memory of the temperature measurement system.

Figure 7:
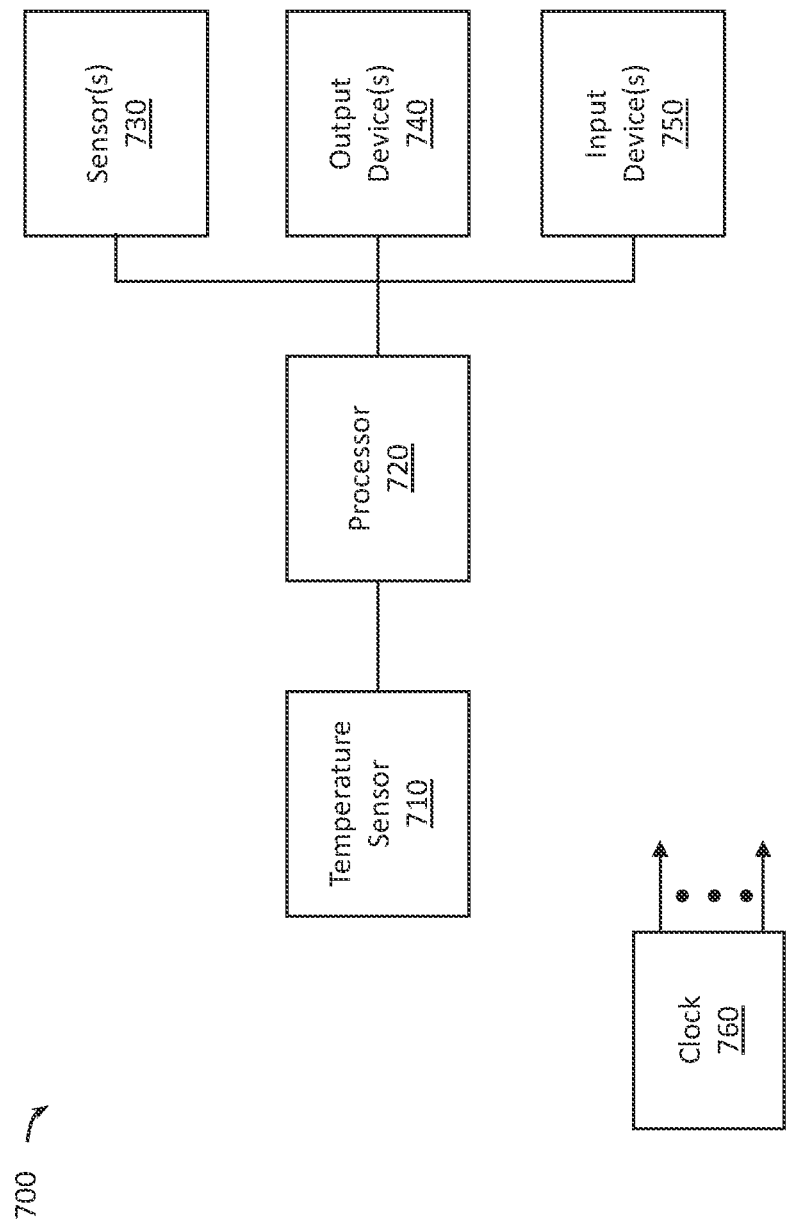
FIG. 7 is a schematic block diagram illustrating an exemplary electronic device with an integrated temperature sensor, according to some embodiments of the present disclosure.

Example Electronic Device Including Temperature Sensor Circuitry with ΔVBE Amplification and Digital Curvature Correction FIG. 7 is a schematic block diagram illustrating an exemplary electronic device 700 with an integrated temperature sensor, according to some embodiments of the present disclosure. The electronic device 700 may include a temperature sensor 710, a processor 720, other sensor(s) 730, output device(s) 740, input device(s) 750, and a clock 760 to provide timing signal(s) for the device 700 components. In some embodiments, the device 700 may reside in an automotive (e.g., in a battery or power management system of a self-driving car). In some embodiments, the device 700 may be part of a battery management system. In some embodiments, the device 700 may be part of a wireless transceiver system. In general, the device 700 may be suitable for use in a wide variety of applications, such as automotive, industrial automation, signal monitoring, instrumentation and measurement applications, or the like.

The temperature sensor 710 may be provided according to the various embodiments described herein and may generate a digital temperature code according to the various embodiments disclosed herein. In an embodiment, the temperature sensor 710 may include temperature sensor circuitry similar to the temperature sensor circuitry 100 of FIG. 1. The processor 720 may be a microprocessor, microcontroller, state machine, or the like. The processor 720 may receive a calculated digital temperature code from the temperature sensor 710 and may adjust the operations of the device 700 according to the temperature code.

In an embodiment, the device 700 may adjust other sensor readings (e.g., from sensor(s) 730) based on the measured temperature. For example, the sensor(s) 730 may include a position sensor, and the position sensor components may be susceptible to variations associated with temperature changes. The processor 720 may adjust the sensor(s) 730 readings based on temperature measurements provided by the temperature sensor 710 and, therefore, improve accuracy of the sensor(s) 730 readings.

In an embodiment, the device 700 may adjust output device(s) operations based on the measured temperature. For example, the output device(s) 740 may include a coolant device such as a fan that operates based on the ambient temperature. The processor 720 may control the output device(s) 740 operations based on temperature measurements provided by the temperature sensor 710 and, therefore, may improve output device(s) 740 operations. In an embodiment, the device 700 may adjust input device(s) inputs based on the measured temperature. For example, the input device(s) 750 may include a touch screen interface, and the interface's sensitivity may be susceptible to temperature variation associated errors. The processor 720 may adjust the input device(s) 750 based on temperature measurements provided by the temperature sensor 710 and, therefore, improve input device(s) 750 operations.

In general, the processor 720 may be configured to receive an indication of a current operating temperature of the device 700 from the temperature sensor 710 and adjusts an operation of a component (e.g., the sensor(s) 730, the output device(s) 740, the input device(s) 750) of the device 700. In some embodiments, the processor 720 can cause a particular component (e.g., associated with sensing, wireless communication, signal monitoring, battery monitoring, industrial automation, testing, instrumentation, measurement, etc.) to operate at a different power state, power down the particular component, reduce an operating frequency of the particular component, or suspend certain operations of the particular component. As discussed above, in an example, the device 700 may be part of a battery management system in an automotive vehicle (e.g., an electrical vehicle), and the processor 720 can cause one or more components in the vehicle to shutdown upon detection of battery overheating. In a further example, the device 700 may be part of an integrated circuit, and the processor 729 can cause a thermal shutdown upon detecting a temperature of the IC above a certain threshold.

Example Temperature Sensor Calibration

Figure 8:
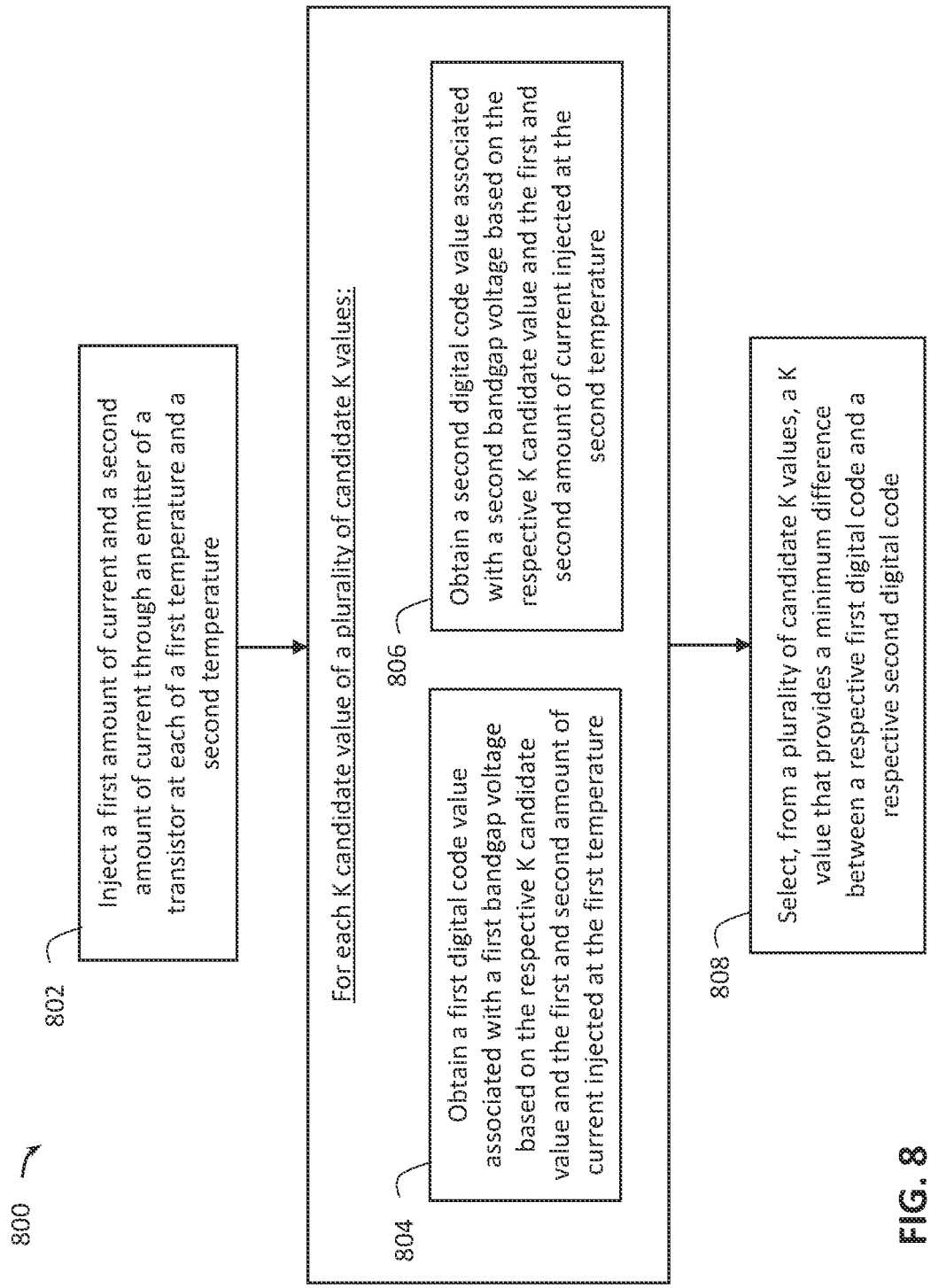
FIG. 8 is a flow diagram illustrating an exemplary method for calibrating a temperature sensor, according to some embodiments of the present disclosure.

FIG. 8 is a flow diagram illustrating an exemplary method 800 for calibrating a temperature sensor, according to some embodiments of the present disclosure. The method 800 can be implemented by a post-production test bench to calibrate a temperature sensor comprising a temperature sensing transistor having an emitter, a base, and a collector. In some embodiments, the temperature sensor may correspond to the temperature sensor circuitry 100 100, and the temperature sensing transistor may correspond to the transistor 116 in the analog temperature sensor circuitry 110 of the temperature sensor circuitry 100. Although the operations of the method 800 may be illustrated with reference to particular embodiments of the temperature sensor circuitry 100 disclosed herein, the method 800 may be performed using any suitable hardware components and/or software components. Operations are illustrated once each and in a particular order in FIG. 8, but the operations may be performed in parallel, reordered, and/or repeated as desired.

At 802, a first amount of current (e.g., a unit current Iu) and a second amount of current (e.g., N units of current, N×Iu) are injected into the emitter of the transistor (e.g., the temperature sensing transistor 116) at each of a first temperature and a second temperature. For instance, one of the first temperature or the second temperature may correspond to a lowest temperature (e.g., about −40 deg C.) within a range of operating temperature to be supported by the temperature sensor, and the other one of the first temperature or the second temperature may correspond to a highest temperature (e.g., about 125 deg C.) within a range of operating temperature to be supported by the temperature sensor. In some embodiments, the production test bench may include control circuitry to cause the injection of the first amount of current and the second amount of current. For example, the temperature sensor may include current sources similar to the current sources 112 and switches similar to the switches 114 that can selectively provide the first and second amount of current, and the test bench may include control circuitry to control the switches to provide the first and second amount of current to the transistor.

Next, the operations of 804 and 806 may be performed for each K candidate value of a plurality of candidate K values.

At 804, a first digital code representative of a first bandgap voltage based on the respective first and second amount of current injected at the first temperature and the respective K value is obtained. In some embodiments, the first bandgap voltage is based on a product of the respective K value and a difference between a first base-emitter voltage and a second base-emitter voltage across the transistor at the first temperature and a sum of the product and the first base-emitter voltage, for example, as shown in the denominator of equation (8) above. The first base-emitter voltage is responsive to the first amount of current at the first temperature. The second base-emitter voltage is responsive to the second amount of current at the first temperature.

At 806, a second digital code value representative of a second bandgap voltage based on the respective first and second amount of current injected at the second temperature and the respective K value is obtained. In some embodiments, the second bandgap voltage is based on a product of the respective K value and a difference between a first base-emitter voltage and a second base-emitter voltage across the transistor at the second temperature and a sum of the product and the first base-emitter voltage, for example, as shown in the denominator of equation (8) above. The first base-emitter voltage is responsive to the first amount of current at the second temperature. The second base-emitter voltage is responsive to the second amount of current at the second temperature.

At 808, a K value that provides a minimum difference between a respective first digital code and a respective second digital code is selected from the plurality of candidate K values. In other words, the selected K value may provide a substantially constant bandgap voltage at the transistor for the first temperature and the second temperature.

In some embodiments, the method 800 may further include determining a first calibration value based on an inverse of the at least one of a respective first digital code or a respective second digital code associated with the selected K value. In some embodiments, the first calibration value can be based on an inverse of the respective first digital code associated with the selected K value. In other embodiments, the first calibration value can be based on an inverse of the respective second digital code associated with the selected K value. In other embodiments, the first calibration value can be based on an inverse of a combination (e.g., an average) of the respective second digital code and the respective second digital code associated with the selected K value. In some embodiments, the method 800 may further include storing, the first calibration value in a memory (e.g., NVM) of the temperature sensor. That is, the temperature sensor may store an inverse of the denominator of equation (8) in the memory so that a temperature can be computed using equation (8) without a division operation in runtime, for example, to save power and/or die area.

In some embodiments, the method 800 may further include determining a second calibration value (e.g., the M value of equation (8)) and a third calibration value (e.g., the offset value of equation (8)) jointly to minimize a difference between a temperature value and the first temperature. The temperature value may be based on a product of the first calibration value, the second calibration value, and a difference between a first base-emitter voltage and a second base-emitter voltage. The temperature value may be further based on a sum of the product and the third calibration value. In some instances, the joint determination of the second and third calibration values can be on a line-fitting approach. In some embodiments, the method 800 may further include storing, at a memory of the temperature sensor, at least one of the second calibration value or the third calibration value. In some embodiments, a combined value of the first calibration value (e.g., the inverse of the digital bandgap reference) and the second calibration value (e.g., the M value of equation (8)) may be stored in a memory (e.g., NVM) of the sensor for runtime temperature calculation.

EXAMPLES

Example 1 includes a temperature sensor device including analog temperature sensor circuitry to generate a plurality of voltages indicative of a temperature; an analog-to-digital converter (ADC) disposed downstream of the analog temperature sensing circuitry; switched-capacitor amplifier circuitry disposed before the ADC, the switched-capacitor amplifier circuitry including a single-ended amplifier; and a first switch coupled between the analog temperature sensor circuitry and the switched-capacitor amplifier circuitry.

In Example 2, the temperature sensor device of Example 1 can optionally include where the switched-capacitor amplifier circuitry further includes a first capacitor coupled between the first switch and a first input of the single-ended amplifier via the first switch; and a second capacitor coupled between the first input and an output of the single-ended amplifier.

In Example 3, the temperature sensor device of Example 2 can optionally include where the switched-capacitor amplifier circuitry further includes a second switch coupled between the first input and the output of the single-ended amplifier; and a third switch coupled between the first switch and a second input of the single-ended amplifier.

In Example 4, the temperature sensor device of any of Examples 1-3 can optionally include where the analog temperature sensor circuitry further includes a transistor including a base, an emitter, and a collector; and a plurality of current sources and a plurality of switches to selectively provide a first amount of current and a second amount of current to the transistor, the transistor generating a first base-emitter voltage responsive to the first amount of current and a second base-emitter voltage responsive to the second amount of current, and the plurality of voltages including the first base-emitter voltage and the second base-emitter voltage; and the switched-capacitor amplifier circuitry amplifies each of the first base-emitter voltage and the second base-emitter voltage with respect to a common voltage.

In Example 5, the temperature sensor device of any of Examples 1-4 can optionally include biasing circuitry including another transistor including a base, an emitter coupled to the second input of the single-ended amplifier, and a collector; and a further current source to provide a third amount of current to the other transistor, where the other transistor generates a third base-emitter voltage responsive to the third amount of current, and where the third base-emitter voltage is provided as the common voltage to the switched-capacitor amplifier circuitry.

In Example 6, the temperature sensor device of any of Examples 1-5 can optionally include where the third amount of current is greater than the second amount of current, and where the second amount of current is greater than the first amount of current.

In Example 7, the temperature sensor device of any of Examples 1-6 can optionally include where a number of the plurality of current sources in the analog temperature sensor circuitry is associated with an amplification gain of the switched-capacitor amplifier circuitry.

In Example 8, the temperature sensor device any of Examples 1-7 can optionally include where the ADC converts the amplified first base-emitter voltage to a respective first digital value and the amplified second base-emitter voltage to a second digital value; and the temperature sensor device further includes processing circuitry to calculate a temperature value based at least in part on the first digital value, the second digital value, and a predetermined scaling factor associated with at least an inverse of a digital bandgap reference.

In Example 9, the temperature sensor device of any of Examples 1-8 can optionally include memory to store the predetermined scaling factor associated with at least the inverse of a digital bandgap reference.

In Example 10, the temperature sensor device of any of Examples 1-9 can optionally include where processing circuitry further adjusts the temperature value by a predetermined digital temperature-dependent compensation value.

In Example 11, the temperature sensor device of any of Examples 1-10 can optionally include memory to store a plurality of digital temperature-dependent compensation values including the predetermined temperature-dependent compensation value.

In Example 12, the temperature sensor device of any of Examples 1-11 can optionally include a multiplexer having inputs coupled to the switched-capacitor amplifier circuitry and the analog temperature sensor circuitry and an output coupled to the ADC.

In Example 13, the temperature sensor device of any of Examples 1-12 can optionally include where the ADC has a resolution of 10 bits or less.

In Example 14, the temperature sensor device of any of Examples 1-13 can optionally include where the switched-capacitor amplifier circuitry provides an amplification gain of at least 9.

Example 15 includes an integrated circuit device including a temperature measurement system including analog temperature sensor circuitry to generate a plurality of voltages indicative of a temperature; switched-capacitor amplifier circuitry including a single-ended amplifier to amplify the plurality of voltages with respect to a common voltage; a first switch coupled between the analog temperature sensor circuitry and the switched-capacitor amplifier circuitry; and digital calculation circuitry to calculate a temperature value based on the plurality of amplified voltages; and a component; and a processor to receive an indication of the calculated temperature; and adjust an operation of the component responsive to the indication.

In Example 16, the integrated circuit device of Example 15 can optionally include where the analog temperature sensor circuitry includes a transistor including a base, an emitter, and a collector; and a plurality of current sources to provide N instances of a first amount of current to the transistor and a second amount of current, where the second amount of current is N times the first amount of current, and where the transistor generates a respective first base-emitter voltage responsive to each instance of the N instances of the first amount of current and a second base-emitter voltage responsive to the second amount of current; and the switched-capacitor amplifier circuitry amplifies each of the first base-emitter voltages and the second base-emitter voltage with respect to a common voltage.

In Example 17, the integrated circuit device of any of Examples 15-16 can optionally include biasing circuitry including another transistor including a base, an emitter coupled to the second input of the single-ended amplifier, and a collector; and a further current source to provide a third amount of current to the other transistor, where the other transistor generates a third base-emitter voltage responsive to the third amount of current, and where the third base-emitter voltage is provided as the common voltage to the switched-capacitor amplifier circuitry.

In Example 18, the integrated circuit device of any of Examples 15-17 can optionally include where the temperature measurement system further includes an analog-to-digital converter (ADC) to convert each of the amplified first base-emitter voltages to a respective first digital value and the amplified second base-emitter voltage to a second digital value; and an accumulator to accumulate the first digital values to generate a third digital value; and the digital calculation circuitry calculates the temperature value further based on the second digital value, the third digital value, and a predetermined scaling factor associated with at least an inverse of a digital bandgap reference; and adjusts the temperature value based on a predetermined offset value associated with at least a temperature-dependent digital bandgap reference compensation.

Example 19 includes a method of measuring a temperature, the method including during a first phase sampling a common voltage of switched-capacitor amplifier circuitry; during a second phase injecting a first amount of current into a transistor to generate a first base-emitter voltage at the transistor; injecting a second amount of current into the transistor to generate a second base-emitter voltage at the transistor; amplifying, via the switched-capacitor amplifier circuitry, the first base-emitter voltage and the second base-emitter voltage with respect to the common voltage; and determining a temperature value based at least in part on the amplified first base-emitter voltage and the amplified second base-emitter voltage.

In Example 20, the method of Example 19 can optionally include injecting a third amount of current into another transistor to generate a third base-emitter voltage at the other transistor, where the other transistor is coupled to an input of the switched-capacitor amplifier circuitry to provide the third base-emitter voltage as the common voltage at the input of the switched-capacitor amplifier circuitry.

In Example 21, the method of any of Examples 19-20 can optionally include where the injecting the first amount of current to the transistor includes injecting N instances of the first amount of current to the transistor to generate a respective first base-emitter voltage at the transistor for each instance, where N is an integer greater than 1; and the second amount of current is N times the first amount of current; and the amplifying the first base-emitter voltage and the second base-emitter voltage further includes amplifying, via the switched-capacitor amplifier circuitry, each of the first base-emitter voltages with respect to the common voltage by a factor of N.

In Example 22, the method of any of Examples 19-21 can optionally include where the injecting the first amount of current to the transistor further includes generate each of the N instances of the first amount of current via a different one of a plurality of current sources; and the injecting the second amount of current to the transistor includes generating the second amount of current via all of the plurality of current sources.

In Example 23, the method of any of Examples 19-22 can optionally include where the determining the temperature value includes converting, via an analog-to-digital-converter (ADC), each of the first base-emitter voltages to a respective first digital value and the second base-emitter voltage to a second digital value; accumulating the first digital values to generate a third digital value; subtracting the third digital value from the second digital value to generate a fourth digital value indicative of an amplified base-emitter difference voltage difference; and multiplying the fourth digital value by a predetermined scaling factor associated with at least an inverse of a digital bandgap reference to produce a fifth digital value.

In Example 24, the method of any of Examples 19-23 can optionally include further including reading, from a memory, the predetermined scaling factor associated with at least the inverse of the digital bandgap reference.

In Example 25, the method of any of Examples 19-24 can optionally include adjusting the temperature value by a predetermined temperature-dependent digital compensation value.

In Example 26, the method of any of Examples 19-25 can optionally include selecting, from a plurality of temperature-dependent digital compensation values, the predetermined temperature-dependent digital compensation value.

In Example 27, the method of any of Examples 19-26 can optionally include reading, from a memory, the predetermined temperature-dependent digital compensation value.

In Example 28, the method of any of Examples 19-27 can optionally include during the first phase: causing a first switch to open, the first switch coupled between an emitter of the transistor and the switched-capacitor amplifier circuitry; and causing a second switch and a third switch to close, the second switch coupled between a first input and an output of a single-ended amplifier of the switched-capacitor amplifier circuitry, and the third switch coupled between the first input and a second input of the single-ended amplifier; during a third phase between the first phase and the second phase: causing the second switch and the third switch to open while the first switch is opened; and during the second phase: causing the first switch to close while the second switch and the third switch are opened.

Example 29 includes a method for calibrating a temperature sensor including a transistor including a base, an emitter, the method including injecting a first amount of current and a second amount of current through the emitter of the transistor at each of a first temperature and a second temperature; for each K value of a plurality of candidate K values: obtaining a first digital code value representative of a first bandgap voltage based on the respective candidate K value and the first and second amount of current injected at the first temperature; and obtaining a second digital code value representative of a second bandgap voltage based on the respective candidate K value and the first and second amount of current injected at the second temperature; and selecting, from a plurality of candidate K values, a K value that provides a minimum difference between a respective first digital code and a respective second digital code.

In Example 30, the method of Example 29 can optionally include where the first bandgap voltage is based on a product of the respective candidate K value and a difference between a first base-emitter voltage and a second base-emitter voltage across the transistor at the first temperature, the first base-emitter voltage responsive to the first amount of current at the first temperature, and the second base-emitter voltage responsive to the second amount of current at the first temperature; and a sum of the product and the first base-emitter voltage.

In Example 31, the method of any of Examples 29-30 can optionally include determining a first calibration value based on an inverse of at least one of a respective first digital code or a respective second digital code associated with the selected K value.

In Example 32, the method of any of Examples 29-31 can optionally include storing, in a memory of the temperature sensor, the first calibration value.

In Example 33, the method of any of Examples 29-32 can optionally include determining a second calibration value and a third calibration value jointly to minimize a difference between a temperature value and the first temperature, where the temperature value is based on a product of the first calibration value, the second calibration value, and a difference between a first base-emitter voltage and a second base-emitter voltage, the first base-emitter voltage responsive to the first amount of current at the first temperature, and the second base-emitter voltage responsive to the second amount of current at the first temperature; and a sum of the product and the third calibration value.

In Example 34, the method of any of Examples 29-33 can optionally include storing, in a memory of the temperature sensor, the third calibration value and a combined value of the first and second calibration value.

Variations and Implementations

While embodiments of the present disclosure were described above with references to exemplary implementations as shown in FIGS. 1-2, 3A-3C, and 4-8, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as transistors, current sources, switches, capacitors, amplifiers, MUX, ADC, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to temperature sensing and measurements, in various systems.

Parts of various systems for temperature sensing with ΔVBE amplification and digital curvature correction as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in FIGS. 1, 3A-3C, and 7) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. A temperature sensor device comprising:
analog temperature sensor circuitry to generate a plurality of voltages indicative of a temperature;
an analog-to-digital converter (ADC) disposed downstream of the analog temperature sensor circuitry; and
switched-capacitor amplifier circuitry disposed before the ADC, the switched-capacitor amplifier circuitry comprising a single-ended amplifier, a second switch coupled between a first input and an output of the single-ended amplifier, and a third switch having a first terminal and a second terminal, wherein the first terminal is coupled to a first switch and the second terminal is directly coupled to a second input of the single-ended amplifier;
wherein the first switch is coupled between the analog temperature sensor circuitry and the switched-capacitor amplifier circuitry.

2. The temperature sensor device of claim 1, wherein the switched-capacitor amplifier circuitry further comprises:
a first capacitor coupled between the first switch and the first input of the single-ended amplifier via the first switch; and
a second capacitor coupled between the first input and the output of the single-ended amplifier.

3. The temperature sensor device of claim 1, further comprising:
a multiplexer having inputs coupled to the switched-capacitor amplifier circuitry and the analog temperature sensor circuitry and an output coupled to the ADC.

4. The temperature sensor device of claim 1, wherein:
the analog temperature sensor circuitry further comprises:
a transistor comprising a base, an emitter, and a collector; and
a plurality of current sources and a plurality of switches to selectively provide a first amount of current and a second amount of current to the transistor, the transistor generating a first base-emitter voltage responsive to the first amount of current and a second base-emitter voltage responsive to the second amount of current, and the plurality of voltages including the first base-emitter voltage and the second base-emitter voltage; and
the switched-capacitor amplifier circuitry amplifies each of the first base-emitter voltage and the second base-emitter voltage with respect to a common voltage.

5. The temperature sensor device of claim 4, further comprising:
biasing circuitry comprising:
a second transistor comprising a second base, a second emitter coupled to the second input of the single-ended amplifier, and a second collector; and
a further current source to provide a third amount of current to the second transistor, wherein the second transistor generates a third base-emitter voltage responsive to the third amount of current, and wherein the third base-emitter voltage is provided as the common voltage to the switched-capacitor amplifier circuitry.

6. The temperature sensor device of claim 4, wherein:
the ADC converts an amplified first base-emitter voltage to a first digital value and an amplified second base-emitter voltage to a second digital value; and
the temperature sensor device further comprises:
processing circuitry to calculate a temperature value based at least in part on the first digital value, the second digital value, and a predetermined scaling factor associated with at least an inverse of a digital bandgap reference.

7. The temperature sensor device of claim 6, further comprising:
memory to store the predetermined scaling factor associated with at least the inverse of the digital bandgap reference.

8. The temperature sensor device of claim 6, wherein the processing circuitry further adjusts the temperature value by a predetermined digital temperature- dependent compensation value.

9. The temperature sensor device of claim 8, further comprising:
memory to store a plurality of digital temperature-dependent compensation values including the predetermined digital temperature-dependent compensation value.

* * * * *